United States Patent
Dimmer et al.

(10) Patent No.: US 12,215,829 B2
(45) Date of Patent: Feb. 4, 2025

(54) BOIL-OFF SHIELDED COUPLING FOR HYDROGEN TANK FILLING

(71) Applicant: Plug Power Inc., Latham, NY (US)

(72) Inventors: Sean Dimmer, Latham, NY (US); Patrick Adam, Latham, NY (US); Ian Richardson, Latham, NY (US)

(73) Assignee: Plug Power Inc., Slingerlands, NY (US)

( * ) Notice: Subject to any disclaimer, the term of this patent is extended or adjusted under 35 U.S.C. 154(b) by 173 days.

(21) Appl. No.: 17/936,669

(22) Filed: Sep. 29, 2022

(65) Prior Publication Data

US 2024/0110671 A1    Apr. 4, 2024

(51) Int. Cl.
*F17C 5/02* (2006.01)
*F16L 59/14* (2006.01)
*F16L 59/18* (2006.01)

(52) U.S. Cl.
CPC .............. *F17C 5/02* (2013.01); *F16L 59/141* (2013.01); *F16L 59/184* (2013.01);
(Continued)

(58) Field of Classification Search
CPC ......... F16L 59/141; F16L 59/184; F17C 5/02; F17C 2221/012; F17C 2223/0153;
(Continued)

(56) References Cited

U.S. PATENT DOCUMENTS 3,316,931 A * 5/1967 Elrod .................... F16L 59/141
                                                    285/354
3,980,112 A * 9/1976 Basham ................... B67D 7/54
                                                    285/123.1
(Continued)

FOREIGN PATENT DOCUMENTS

CN       201228852 Y    4/2009
JP       2005069330 A   3/2005
(Continued)

OTHER PUBLICATIONS

Dimmer et al., International Patent Application No. PCT/US2023/075519, entitled "Boil-Off Shielded Coupling For Hydrogen Tank Filling" filed on Sep. 29, 2023, 51 pages.
(Continued)

*Primary Examiner* — Nicolas A Arnett
(74) *Attorney, Agent, or Firm* — Heslin Rothenberg Farley & Mesiti P.C.; Victor A. Cardona, Esq.

(57) ABSTRACT

A hydrogen fuel coupling system may include a hydrogen fuel tank and a hydrogen fuel supply connector. The tank has a first connector, and a second connector disposed around the first connector. The second connector has a boil-off inlet port for receiving gaseous hydrogen from the tank. The hydrogen fuel supply connector may include a hydrogen fuel transfer line, a third connector for operably sealably connecting the transfer line to a first connector of the tank for supplying liquid hydrogen, and a shroud extending around the third connector and the transfer line defining a gap therebetween. A fourth connector operably sealably connects a first end of the shroud to a second connector of the tank. A second end of the shroud is operably sealably engageable with the transfer line. A boil-off vent is connected to the shroud for venting gas from the gap.

13 Claims, 24 Drawing Sheets

(52) U.S. Cl.
CPC .............................. *F17C 2221/012* (2013.01); *F17C 2223/0153* (2013.01); *F17C 2227/04* (2013.01); *F17C 2265/031* (2013.01); *F17C 2270/0168* (2013.01)

(58) Field of Classification Search
CPC .............. F17C 2227/04; F17C 2265/03; F17C 2265/031; F17C 2270/0168
See application file for complete search history.

(56) References Cited

U.S. PATENT DOCUMENTS

| | | | | |
|---|---|---|---|---|
| 6,134,893 | A * | 10/2000 | Bonn | F16L 27/0828 62/50.7 |
| 6,682,102 | B1 * | 1/2004 | Betz | F16L 39/005 285/123.1 |
| 7,052,047 | B1 * | 5/2006 | Box | F16L 59/184 62/50.7 |
| 7,427,084 | B1 * | 9/2008 | Betz | F16L 23/02 285/123.17 |
| 10,451,220 | B2 * | 10/2019 | Lee | F17C 5/007 |
| 11,933,458 | B1 * | 3/2024 | Fairy | F17C 5/06 |
| 2004/0051308 | A1 * | 3/2004 | Coates | B67D 7/0488 285/124.1 |
| 2007/0241560 | A1 * | 10/2007 | Malone | F16L 9/19 285/123.3 |
| 2008/0246275 | A1 * | 10/2008 | Weh | F16L 39/04 285/123.12 |
| 2021/0285604 | A1 * | 9/2021 | Kim | F17C 7/04 |
| 2021/0356065 | A1 * | 11/2021 | Zaborszki | F16L 33/01 |
| 2022/0282837 | A1 * | 9/2022 | Gustafson | F16L 37/36 |

FOREIGN PATENT DOCUMENTS

| | | |
|---|---|---|
| KR | 102328718 B1 | 11/2021 |
| KR | 102328719 B1 | 11/2021 |

OTHER PUBLICATIONS

Dimmer et al., International Search Report and Written Opinion, International Application No. PCT/US2023/075519, 12 pages, Jan. 10, 2024.

* cited by examiner

BOIL-OFF SHIELDED COUPLING FOR HYDROGEN TANK FILLING

TECHNICAL FIELD

This present disclosure relates in general to hydrogen tank filling, and, more particularly to systems and methods employing a boil-off shielded coupling for hydrogen tank filling.

BACKGROUND

Liquid hydrogen tanks are typically chilled by filling with liquid hydrogen and vaporizing until the vessel walls have cooled enough to hold the hydrogen in its liquid state. The release of gaseous hydrogen during the fueling process is vented safely to a hydrogen vent stack. Additionally, air can liquefy near the fuel nozzles and pose a hazard whereby liquid oxygen comes into close contact with the operator and any hydrogen leaks. Heavy vacuum-jacketed bayonet-type fittings have been used for filling large hydrogen storage tanks.

SUMMARY

Shortcomings of the prior art are overcome and additional advantages are provided through the provision, in one embodiment, of a hydrogen fuel coupling system having, for example, a hydrogen fuel tank and a hydrogen fuel supply connector. The hydrogen fuel tank may include a body with a chamber therein for storing liquid hydrogen, a first connector in fluid communication with the chamber, and a second connector disposed around the first connector. The second connector has a boil-off inlet port for receiving gaseous hydrogen from the chamber. The hydrogen fuel supply connector may include a hydrogen fuel transfer line having a passageway therethrough and operably connectable to a liquid hydrogen supply, a third connector for operably sealably connecting the hydrogen fuel transfer line to the first connector of the hydrogen fuel tank for supplying, via the passageway, liquid hydrogen to the chamber in the hydrogen fuel tank, and a shroud extending around the third connector and the hydrogen fuel transfer line defining a gap therebetween. The shroud has a first end and a second end. The second end is operably sealably engageable with the hydrogen fuel transfer line. A fourth connector operably sealably connects a first end of the shroud to the second connector of the hydrogen fuel tank. A boil-off vent is connected to the shroud for venting gas from the gap.

In some embodiments, a grooved collar is fixedly disposed around the hydrogen fuel transfer line. The grooved collar has a first groove and a spaced-apart second groove. A ring is slidably disposed around the grooved collar. A compression spring is disposed between the shroud and the ring for biasing the shroud away from the ring. At least one first handle is fixedly attached to the ring, and at least one second handle is movably attached to the ring. The second handle is attached to a movable member having a distal end selectably disposable in the first groove and the second groove. A cover extends around the shroud, and the cover is fixedly connected to the ring. The cover may include at least one catch for selectively engaging at least one first pin attached to the shroud to selectively rotatably lock the cover to the shroud, and at least one curved groove engageable with at least one second pin attached to the second connector of the hydrogen fuel tank to move the cover and ring relative to the shroud.

In another embodiment, a method is provided, which includes, for example, providing the above-described hydrogen fuel coupling systems, connecting the hydrogen fuel supply connector to the hydrogen fuel tank, supplying liquid hydrogen from a liquid hydrogen supply via the hydrogen fuel supply connector to the hydrogen fuel tank, and venting boil-off gas from the shroud.

In another embodiment, a method is provided, which includes, for example, transferring liquid hydrogen from a liquid hydrogen supply through a hydrogen fuel supply transfer line to a hydrogen fuel tank, transferring boil-off gas from the hydrogen fuel tank into an annular gap disposed around the connection between the hydrogen fuel supply transfer line and the hydrogen fuel tank, and venting the boil-off gas from the annular gap.

In another embodiment, a method is provided, which includes, for example, engaging a first connector of a hydrogen fuel tank with a third connector attached to a hydrogen fuel transfer line, rotating the third connector and a shroud about a longitudinal axis of the first connector to sealably lock the third connector to the first connector, and axially moving the shroud attached to a fourth connector into contact with a second connector of the hydrogen fuel tank for receiving boil-off gas from the hydrogen tank.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

Figure 1:
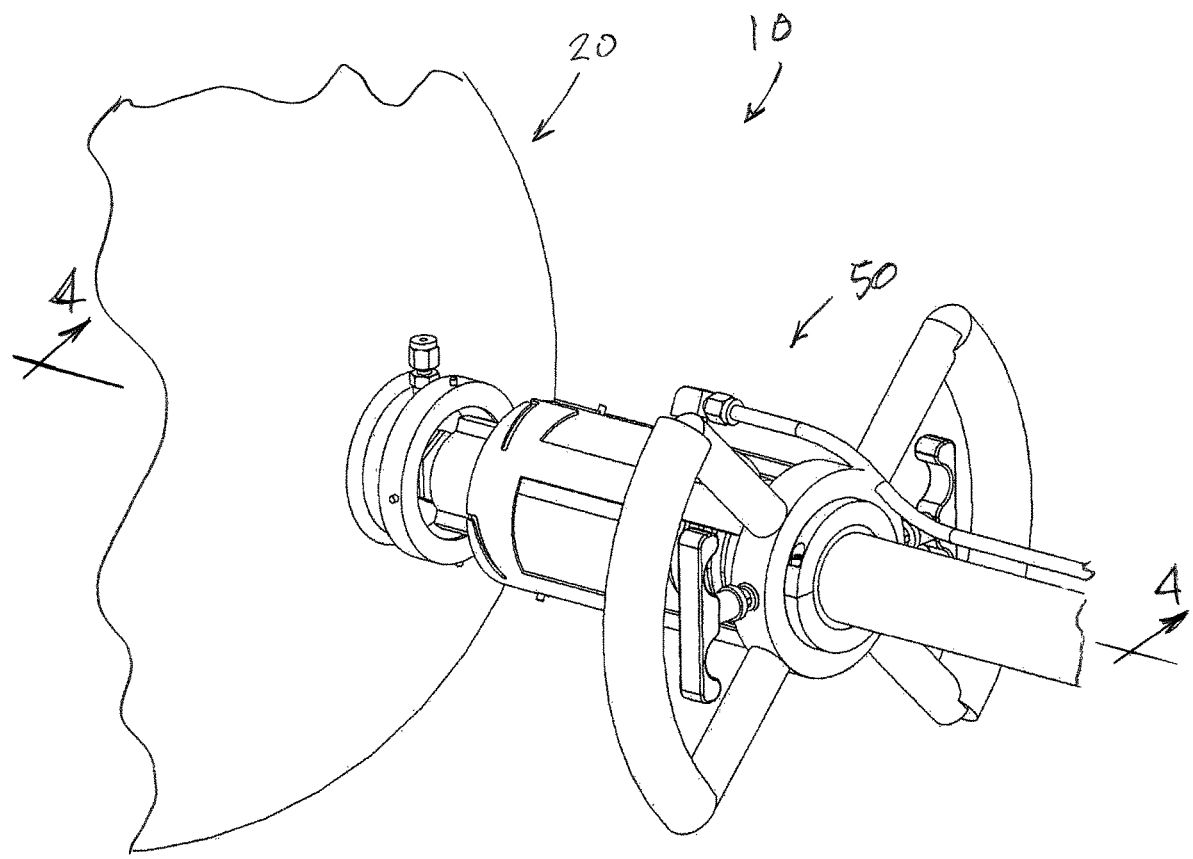
FIG. 1 is a perspective view of a hydrogen fuel coupling system, according to an embodiment of the present disclosure.

In accordance with the principles of the present disclosure, systems and methods are provided for a boil-off shielded coupling. For example, such a coupling may be operable for small-scale liquid hydrogen tank filling such as for use in an unmanned aerial vehicle.

Generally, in some embodiments, the coupling surrounds a quick connector with a shroud that forms an interior cavity or gap connected to a gas boil-out outlet portion of a hydrogen fuel tank. As the hydrogen fuel tank is filled with liquid hydrogen, gaseous hydrogen is generated until the interior of the fuel tank is brought to an appropriate temperature for liquid hydrogen storage. The gaseous hydrogen generated flows to the interior cavity or gap of the shroud which is connected to a boil-off vent line to vent the hydrogen gas generated through the fueling process. The venting of the gaseous hydrogen, waste gas, or otherwise displaces other gases and inhibits the liquification of oxygen near the coupling that may otherwise be present in ambient air that could liquify near or on a quick connect fitting used for the liquid hydrogen filing of the hydrogen fuel tank. As will be appreciated, liquefaction of oxygen near an unshielded and non-vacuum-jacketed coupling or other component may poses a risk whereby a highly concentrated oxygen source is directly adjacent to a fuel source (in the case of a leak), which increases risk of ignition. Even if there is a perfect barrier between the liquid oxygen and hydrogen, liquid oxygen may be dangerous to handle and can drip onto highly concentrated forms of carbon, like asphalt, and spontaneously combust. The technique of the present disclosure may reduce, if not eliminate the formation of concentrated oxidant altogether, and reduce the likelihood of other components in the air like water vapor freezing out and locking up moving parts, including those in quick-connect fittings.

As described in greater detail below, a sealed boil-off shielded coupling in some embodiments flows hydrogen boil-off gas directly over a quick-connect fitting between a hydrogen fuel transfer line and a fuel tank to displace air and prevent accumulation of liquid oxygen. In particular, the boil-off shielded coupling may use boil-off gas from initially filling a liquid hydrogen tank to shield the quick-connect type fitting from liquid oxygen accumulation and to capture hydrogen leaks. Because the shroud is sealed, the boil-off gas can then be routed back along the liquid hydrogen transfer line through a separate vent line to a fueling station for safe venting. In some embodiments, the hydrogen fuel tank may require minimal hardware to interface with the fuel supply connector coupler reducing added weight to the hydrogen fuel tank. Such hydrogen fuel tanks according to the present disclosure may be advantageous for use in hydrogen powered vehicles such as unmanned aerial vehicles compared to other options. It will be appreciated that the coupling system of the present disclosure may be installed on vehicles other than unmanned aerial vehicles with different connectors and configurations. A secondary function of the present coupling system may include capturing any leaks or gas from the coupling system.

In some embodiments, the shroud may include insulation around the interior cavity or gap and sealing mechanisms for sealing the shroud around the interior cavity or gap containing a quick-connect fitting when connecting to the hydrogen fuel tank. For example, a sealing face of the shroud may mate with a sealing face of the hydrogen fuel tank. Locking pins may be located on the fuel tank for engagement with slots in the coupling system. Handles may be manipulated to move pins outwardly to allow rotation and forward movement of a quick-connect shroud to allow the sealing engagement of the coupling system with the hydrogen fuel tank. A conduit may connect an inlet port on a sealing portion of the tank with an outlet port of the tank to allow gaseous hydrogen to flow from the interior of the hydrogen tank to the inlet port to the interior cavity or gap of the coupling system to a boil off vent line. Gas from the interior of the hydrogen fuel tank is vented to the cavity or gap of the coupling system for venting as a waste gas or otherwise, and where the gas is used to displace ambient air or another potentially dangerous gas that may otherwise be located and formed around the coupling system.

In some embodiments, the technique of the present disclosure may operate in two stages. First, a fuel connection, for example, using a quick-connect fitting, and second, for example, a sealing of a shroud.

For example, in an embodiment, a female quick-connect fitting on a hydrogen fuel transfer line is surrounded by a shroud with a face seal (which contacts a smooth metal face on the tank) and a dynamic seal (which slides along the end of the hydrogen fuel transfer line) to trap hydrogen boil-off gas around the quick-connect fitting and route it back to a safe venting location. In some embodiments, the shroud is keyed such that it maintains the same rotation as the quick-connect fitting. A cover collar which slides along the outside of the shroud may be used to twist-lock the face of the shroud to the hydrogen fuel tank via a set of pins on the hydrogen fuel tank. The operator may use a handle on the locking cover to actuate the coupling rotationally, and operate spring-loaded movable members to slide the shroud and cover toward/away from the hydrogen fuel tank. Two grooves in a collar may be provided for receiving the spring-loaded movable members, locking the shroud assembly "closed" and "open." Handles may be provided that are operable to turn the locking cover, shroud, and female quick connect on the hydrogen transfer line. Once the face of the shroud meets the hydrogen fuel tank, a set of pins on the shroud may be removed from locking slots on the locking cover allowing a final twist-lock motion of the assembly without turning the already-fastened quick-connect.

FIG. 1 illustrates a hydrogen fuel coupling system 10, according to an embodiment of the present disclosure. In this exemplary embodiment, hydrogen fuel coupling system 10 may generally include a hydrogen fuel tank 20 and a hydrogen fuel supply connector 50.

Figure 2:
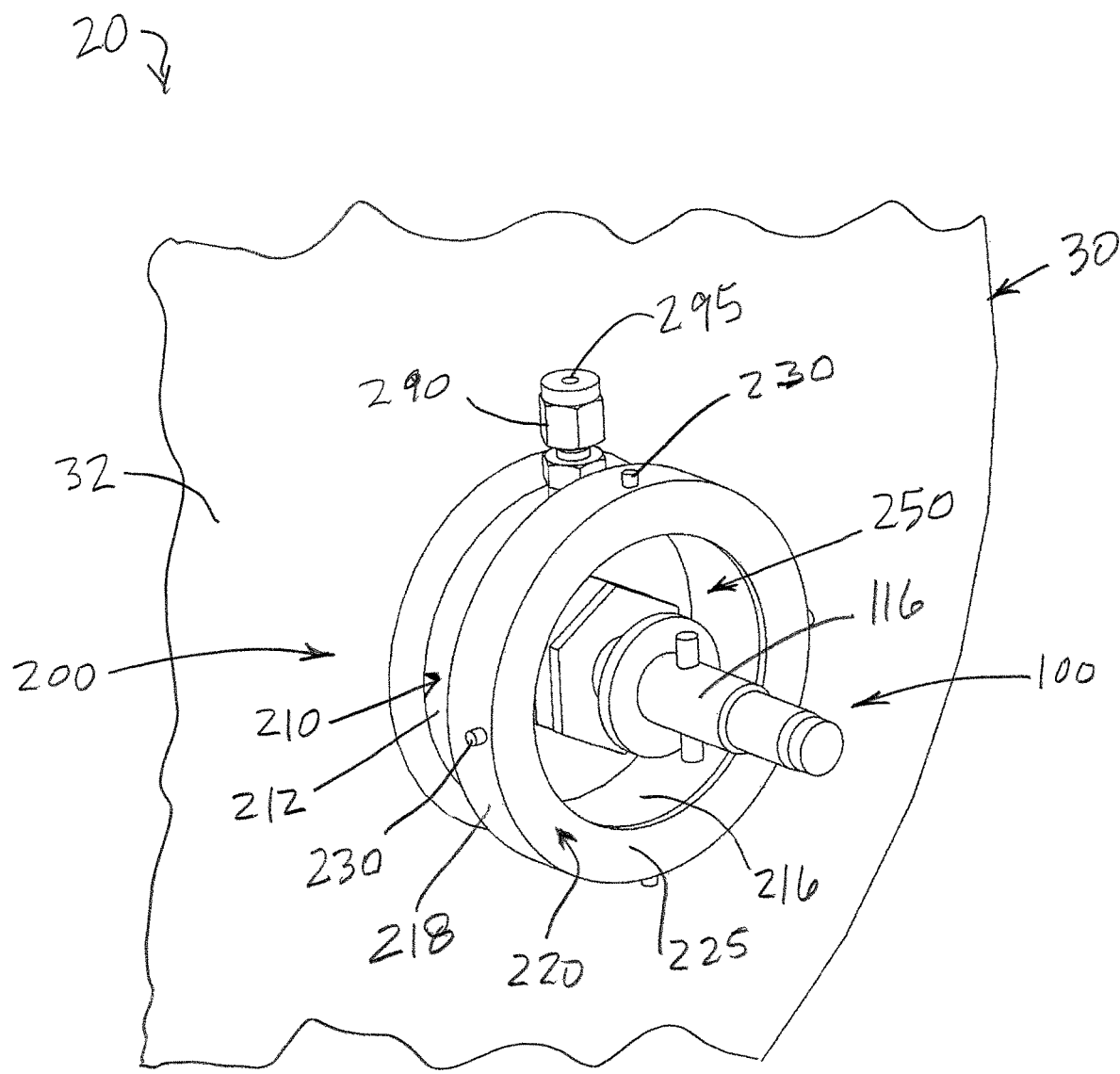
FIG. 2 is an enlarged perspective view of the hydrogen fuel tank of FIG. 1, according to an embodiment of the present disclosure.

As shown in FIG. 2, hydrogen fuel tank 20 may generally include a body 30, a first connector 100, and a second connector 200, according to an embodiment of the present disclosure. Body 30 may be a single or multi wall structure having a chamber 35 (FIG. 4) therein for storing liquid hydrogen.

First connector 100 is in fluid communication with chamber 35 (FIG. 4) of body 30 of hydrogen fuel tank 20. In some embodiments, first connector 100 may be a male portion of a quick connector.

With reference still to FIG. 2, connector 200 may be disposed around first connector 100. For example, second connector 200 may include a hollow cylinder 210 attached to hydrogen fuel tank 20. For example, hollow cylinder 210 may have a first annular end 212, a second annular end 214 (FIG. 4), an inner surface 216, and an outer surface 218. First end 212 is operably attached and sealed to an outer wall 32 of body 30 of hydrogen fuel tank 20. Second end 214 may be attached to an annular cap 220 having an annular mating surface 225. An annular cavity 250 may be disposed between an outer surface 116 of first connector 100 and inner surface 216 of second connector 200.

Figure 4:
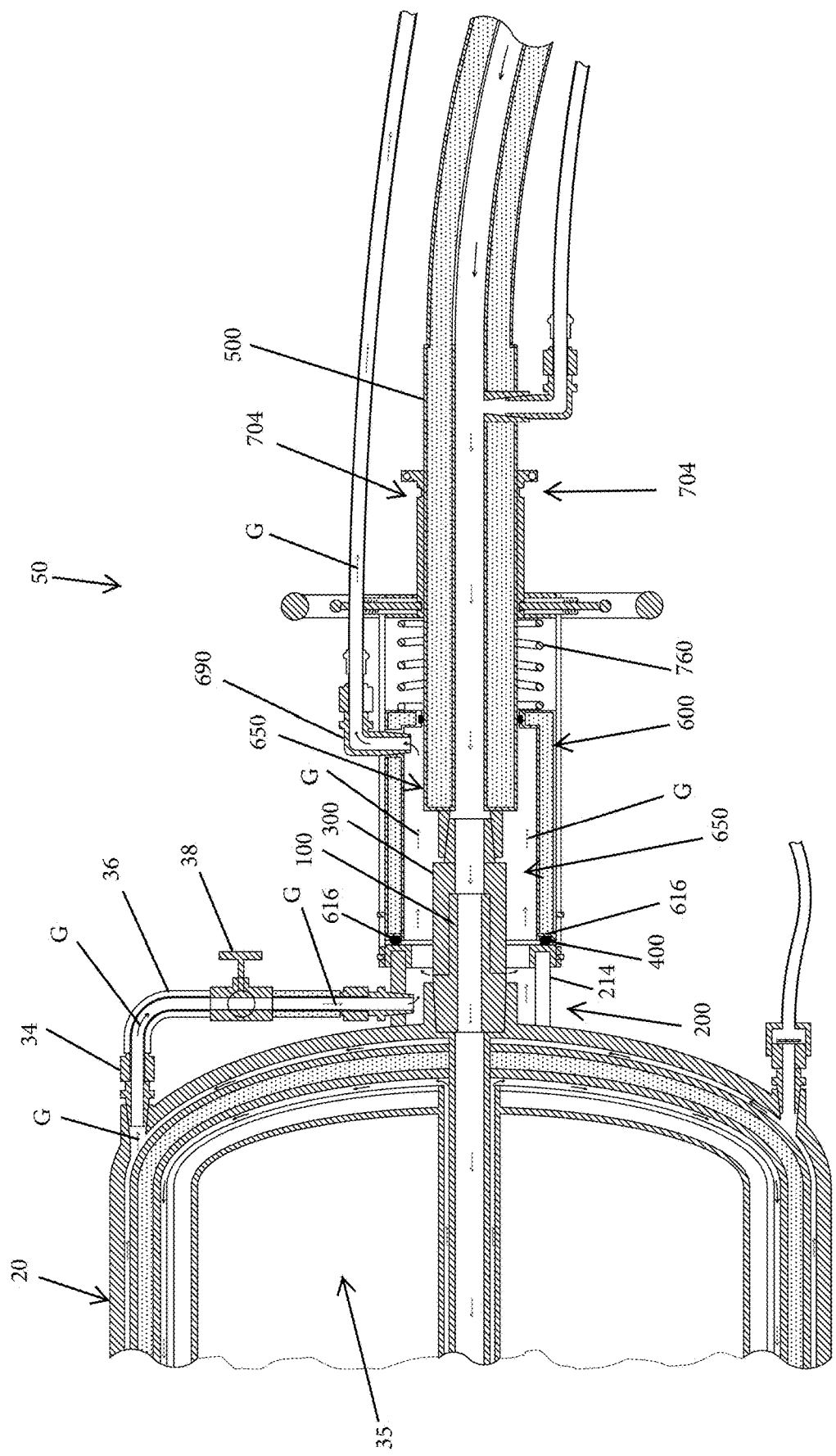
FIG. 4 is a cross-sectional view of the hydrogen fuel coupling system taken along line 4-4 in FIG. 1, according to an embodiment of the present disclosure.

A boil-off inlet port 290 may extend through hollow cylinder 210 of second connector 200. Boil-off inlet port 290 may include a passageway 295 for receiving gaseous hydrogen from hydrogen fuel tank 20. As shown in FIG. 4, an inlet port 290 may be attached via a tube or boil-off line 36 to hydrogen fuel tank 20. A valve 38 may be provided in boil-off line 36 for selectively opening and closing boil-off line 36.

With reference again to FIG. 2, second connector 200 may include a plurality of locking pins 230 extending outwardly from annular cap 220. For example, plurality of locking pins 230 may include four locking pins, each of which disposed 90 degrees from each other along hollow cylinder 210.

Figure 3:
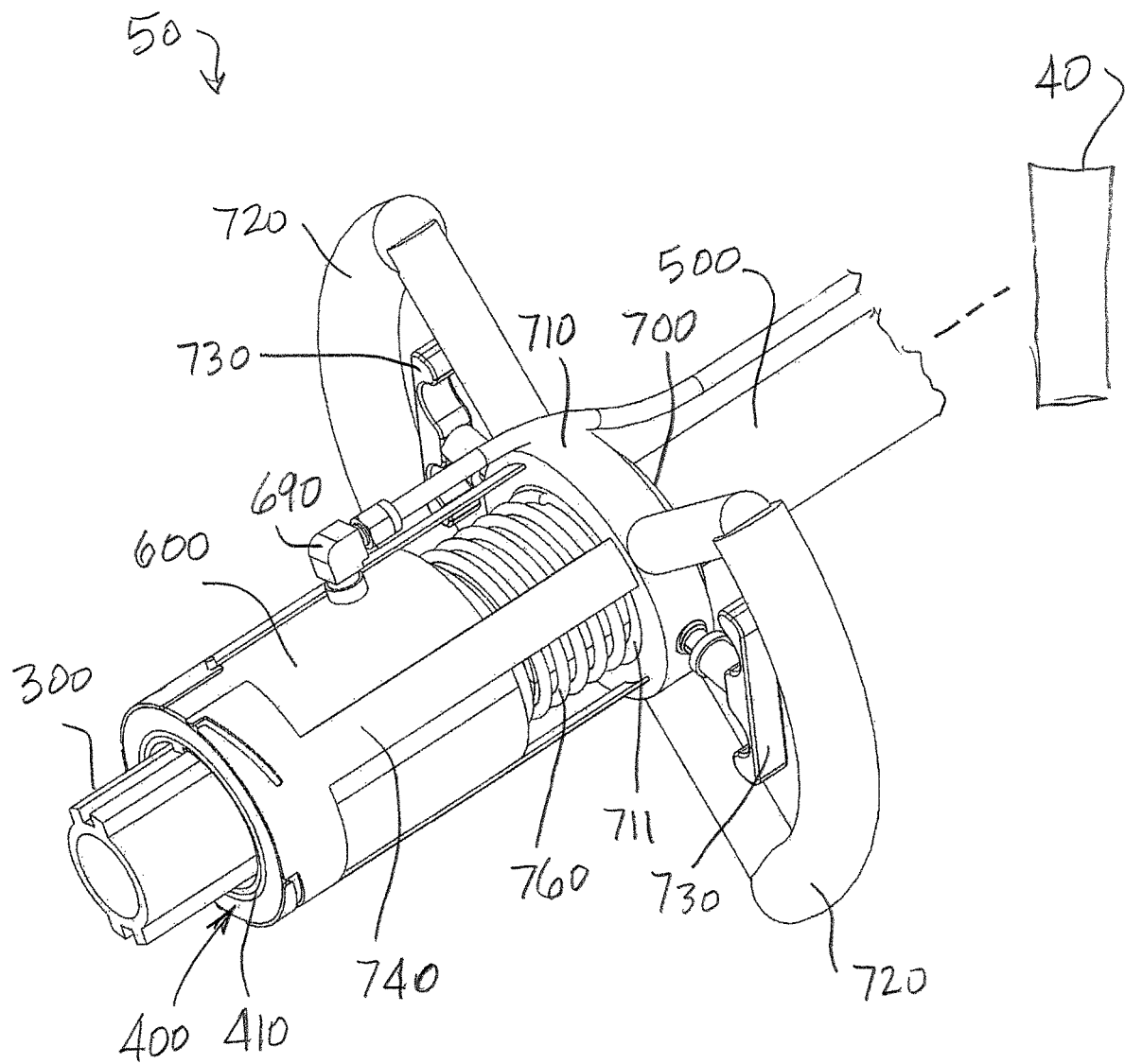
FIG. 3 is an enlarged perspective view of the hydrogen fuel supply connector of FIG. 1, according to an embodiment of the present disclosure.

With reference to FIG. 3, hydrogen fuel supply connector 50 may generally include a third connector 300, a fourth connector 400, a hydrogen fuel transfer line 500, a boil-off shield or shroud 600, and a boil-off vent 690, according to an embodiment of the present disclosure. Hydrogen fuel transfer line 500 may be operably connectable to a liquid hydrogen supply 40.

As shown in FIG. 4, third connector 300 may be operably sealably connected to hydrogen fuel transfer line 500 and operably sealably connectable to first connector 100 of hydrogen fuel tank 20 for supplying liquid hydrogen from liquid hydrogen supply 40 (FIG. 3) to chamber 35 of hydrogen fuel tank 20. In some embodiments, third connector 300 may be a female portion of a quick connector, or other suitable connector.

Figure 5:
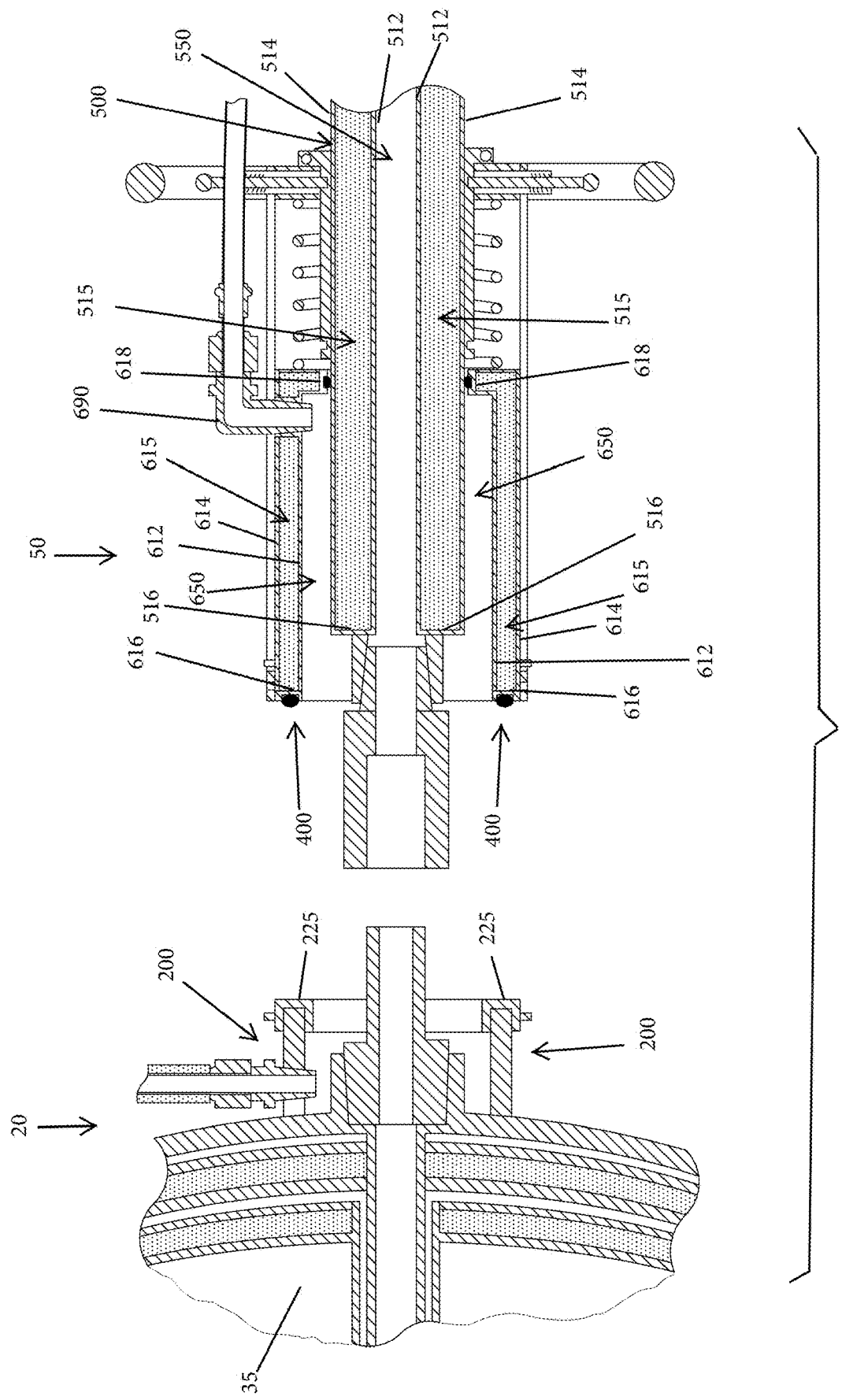
FIG. 5 is an enlarged cross-sectional view of the hydrogen fuel coupling system similar to FIG. 4 with the hydrogen fuel supply connector spaced from the hydrogen fuel tank, according to an embodiment of the present disclosure.

With reference to FIG. 5, fuel transfer line 500 may include an inner wall 512, an outer wall 514 spaced from inner wall 512, a first end wall 516 and a second end wall (not shown) attached to inner wall 512 and outer wall 514 to define an annular cavity 515 disposed therein. An aerogel blanket insulation may be disposed in cavity 515 of hydrogen fuel transfer line 500. In other embodiments, a vacuum, suitable gas, or other suitable insulating material (e.g., pearlite, MLI radiation shielding, etc.) may be operably sealably disposed in cavity 515 of hydrogen fuel transfer line 500. Inner wall 512 may define a passageway 550 for supplying liquid hydrogen from liquid hydrogen supply 40 (FIG. 3) to chamber 35 of hydrogen fuel tank 20.

Shroud 600 may include an inner wall 612, an outer wall 614 spaced from inner wall 612, and a first end wall 616 and a second end wall 618 disposed between inner wall 612 and outer wall 614 to define generally annular cavity 615 disposed therein. An aerogel blanket insulation may be disposed in in cavity 615 of shroud 600. In other embodiments, a vacuum or a suitable gas may be operably sealably disposed in cavity 615 of shroud 600.

Inner wall 612 of shroud 600 extends around third connector 300 and fuel transfer line 500 defining an annular gap 650 therebetween for receiving gaseous hydrogen from hydrogen fuel tank 20. Boil-off vent 690 is connected to shroud 600 for venting gaseous hydrogen from gap 650.

Figure 6:
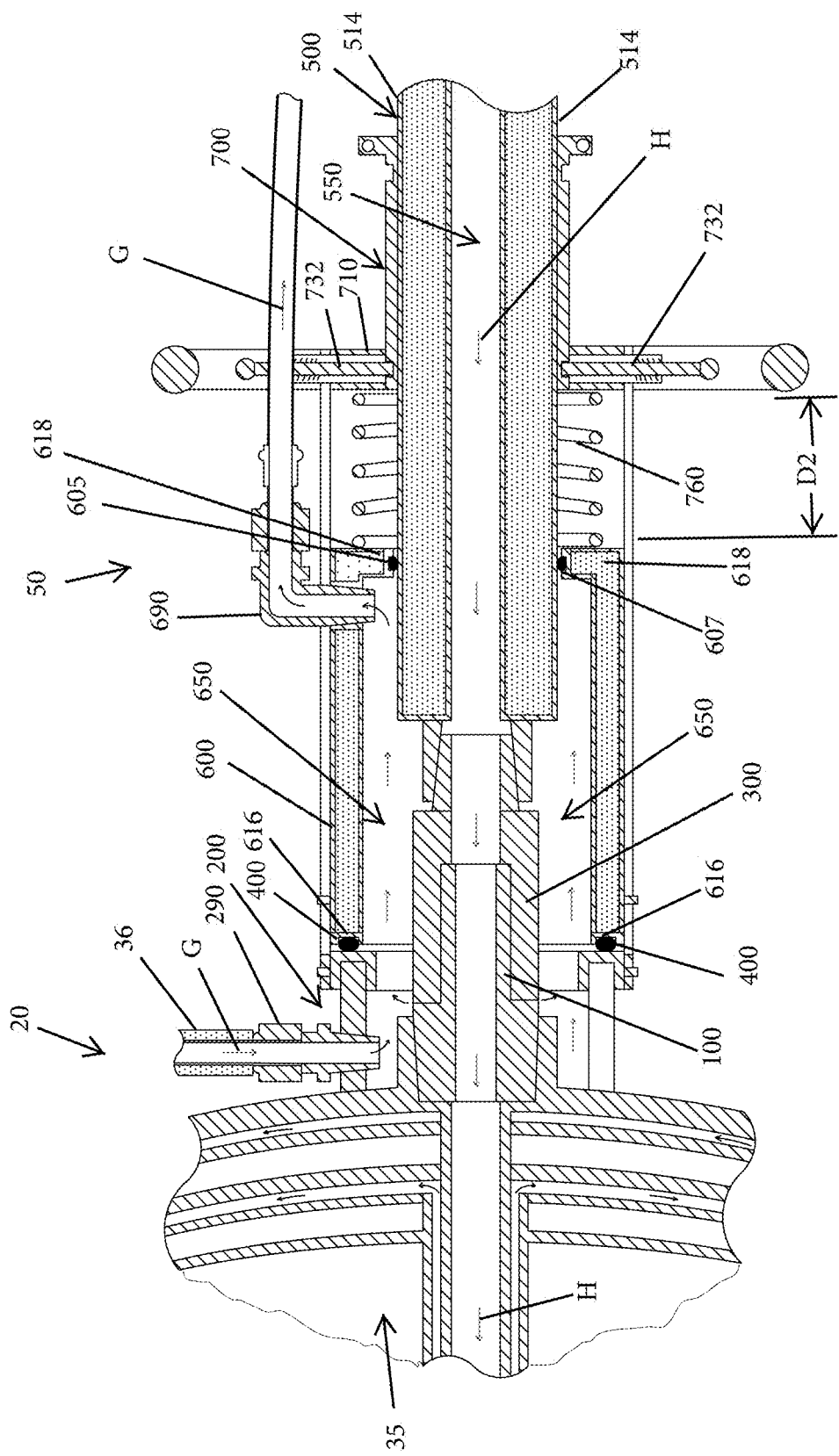
FIG. 6 is a cross-sectional view of the hydrogen fuel coupling system of FIG. 5 with the hydrogen fuel supply connector connected to the hydrogen fuel tank, according to an embodiment of the present disclosure.

Shroud 600 may be operably sealed to fuel transfer line 500. As shown in FIG. 6, shroud 600 may slidably and sealably engage outer surface 514 of fuel transfer line 500. For example, second end wall 618 may include an annular groove 605 for receiving a seal 607 such as an O-ring or annular seal formed from, for example, a synthetic rubber or plastic material. It will be appreciated that the slidable sealing of the second end 618 of shroud 600 to fuel transfer line 500 may employ other slidable sealable mating surfaces or engagements.

Fourth connector 400 may operably seal first end wall 616 of shroud 600 to second connector 200 of hydrogen fuel tank 20 for receiving gaseous hydrogen from chamber 35 of hydrogen fuel tank 20 as described below. For example, first end wall 616 of shroud 600 may include an annular groove 617 (FIG. 7) for receiving fourth connector 400 for mating and sealably engaging first end wall 616 of shroud 600 to surface 225 (FIG. 2) of second connector 200. In some embodiments, fourth connector may be an O-ring or annular seal formed from, for example, a synthetic rubber or plastic. It will be appreciated that second connection and fourth connector may employ other sealable mating surfaces or engagements.

With reference still to FIG. 6, third connector 300 is initially connected to first connector 100, then fourth connector 400 is connected to second connector 200 as further described below. When hydrogen fuel supply connector 50 is operably connected to hydrogen fuel tank 20, liquid hydrogen from a hydrogen supply 40 (FIG. 3) may be made to traverse passageway 550 in fuel transfer line 500 in the direction of arrows H to a chamber 35 in hydrogen fuel tank 20. With reference to FIGS. 4 and 6, upon initial filing of hydrogen fuel tank 20 with liquid hydrogen, gaseous hydrogen generated in hydrogen fuel tank 20 flows in the direction of arrows G via a boil-off outlet port 34 (FIG. 4) attached to hydrogen fuel tank 20, through boil-off line 36, through boil-off inlet port 290, through gap 650, and vented from gap 650 in shroud 600 via boil-off vent 690 to inhibit liquification of ambient air near or on attached first connector 100, third connector 300, and transfer line 500.

Figure 7:
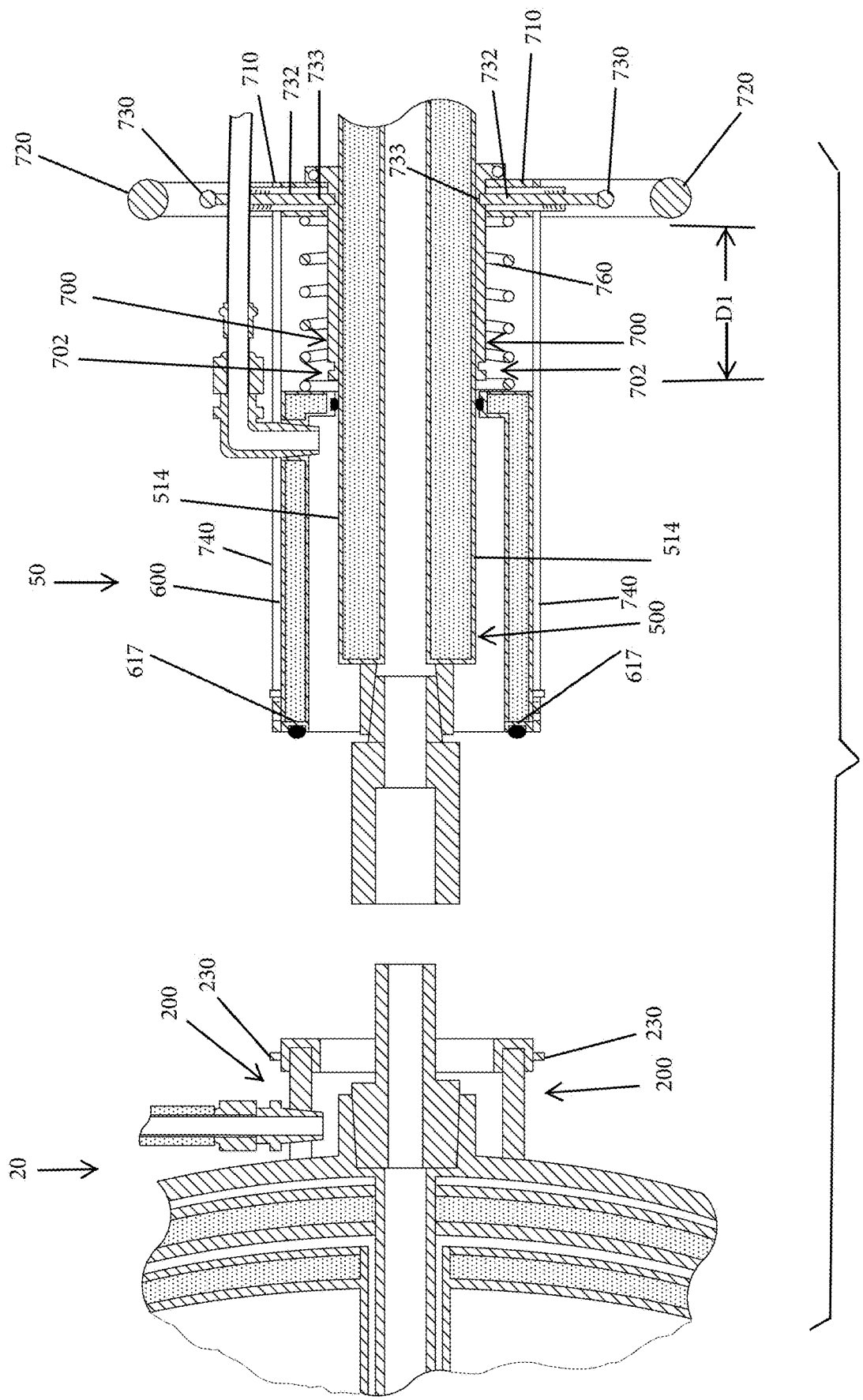
FIG. 7 is an enlarged cross-sectional view of the hydrogen fuel coupling system similar to FIG. 4 with the hydrogen fuel supply connector spaced from the hydrogen fuel tank, according to an embodiment of the present disclosure.

With reference to FIGS. 3 and 7, hydrogen fuel supply connector 50 may also generally include a grooved collar 700, a ring 710, one or more outer handles 720, one or more inner handles 730, a shroud cover 740, and a compression spring 760, according to an embodiment of the present disclosure.

Figure 12:
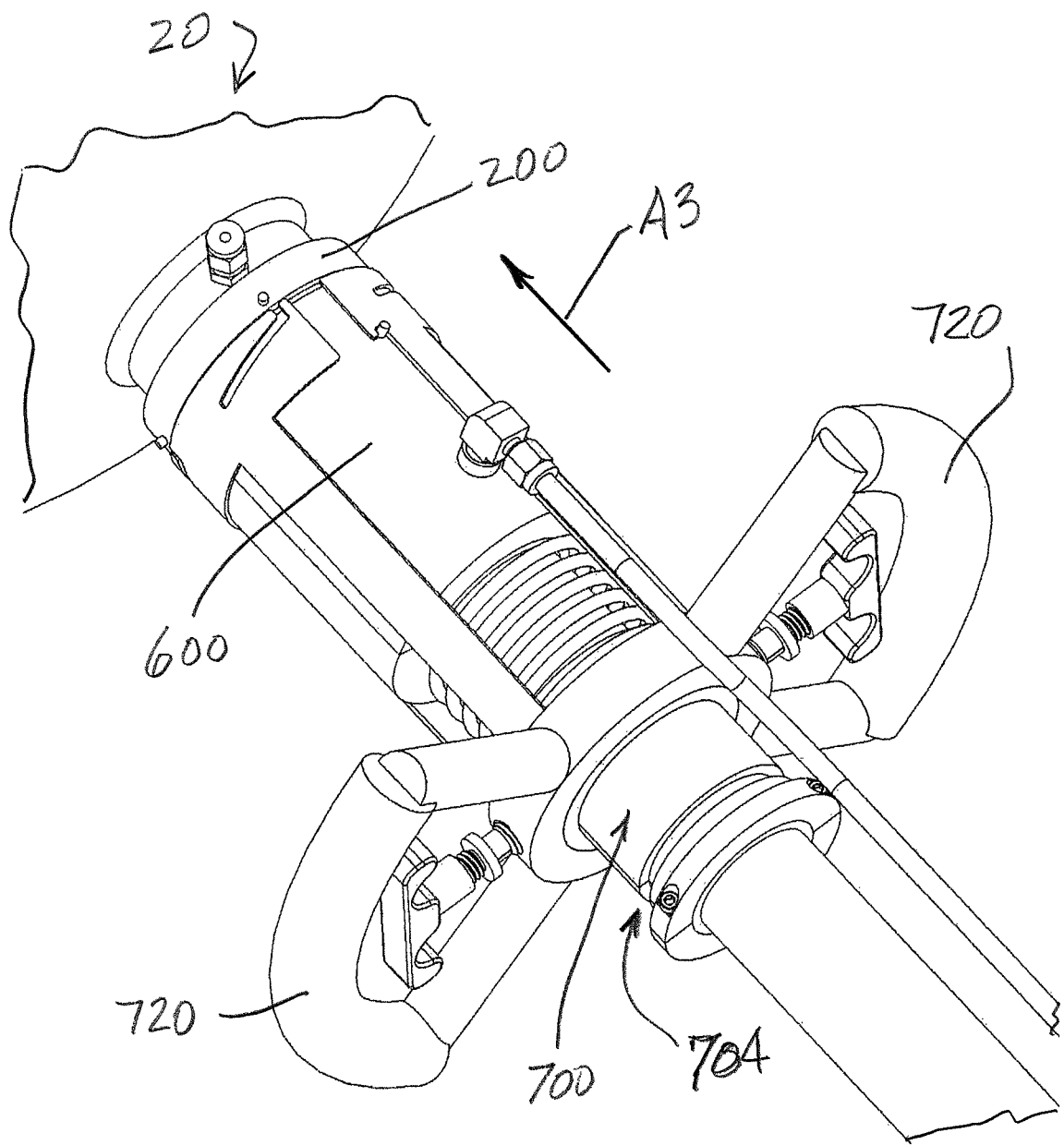

For example, collar 700 may include a first groove 702 and a spaced apart second groove 704 (best shown in FIG. 12). Collar 700 extends around and includes an inner surface operably fixedly secured to outer surface 514 of hydrogen fuel transfer line 500. Ring 710 is slidably disposed around grooved collar 700. At least one outer handle 720 is fixedly attached to ring 710. At least one Inner handle 730 is movably attached to ring 710 and may include a spring biased movable member 732 (FIG. 7). Inner handle 730 may be spring biased so that a distal end 733 (FIG. 7) of locking movable member 732 is selectably disposable in first groove 702 (FIG. 7) of collar 700 and in second groove 704. Shroud cover 740 includes a first end and a second end attachable to ring 710. Shroud cover 740 extends around shroud 600. In some embodiments, ring 710 may include a TEFLON bearing 711 (FIG. 3) that slidably moves along collar 700.

Ring 710, outer handle 720, inner handle 730, and shroud cover 740 are slidable as a unit relative to collar 700 between a first locked position as shown in FIGS. 3 and 7 prior to connecting hydrogen fuel supply connector 50 to hydrogen fuel tank 20, and a second locked position as shown in FIG. 4 upon connecting hydrogen fuel supply connector 50 to hydrogen fuel tank 20. Shroud 600 and compression spring 760 are also slidable as the unit up until contact of fourth connector 400 with second connector 200 in the process of moving between the first and second locked positions.

Figure 8:
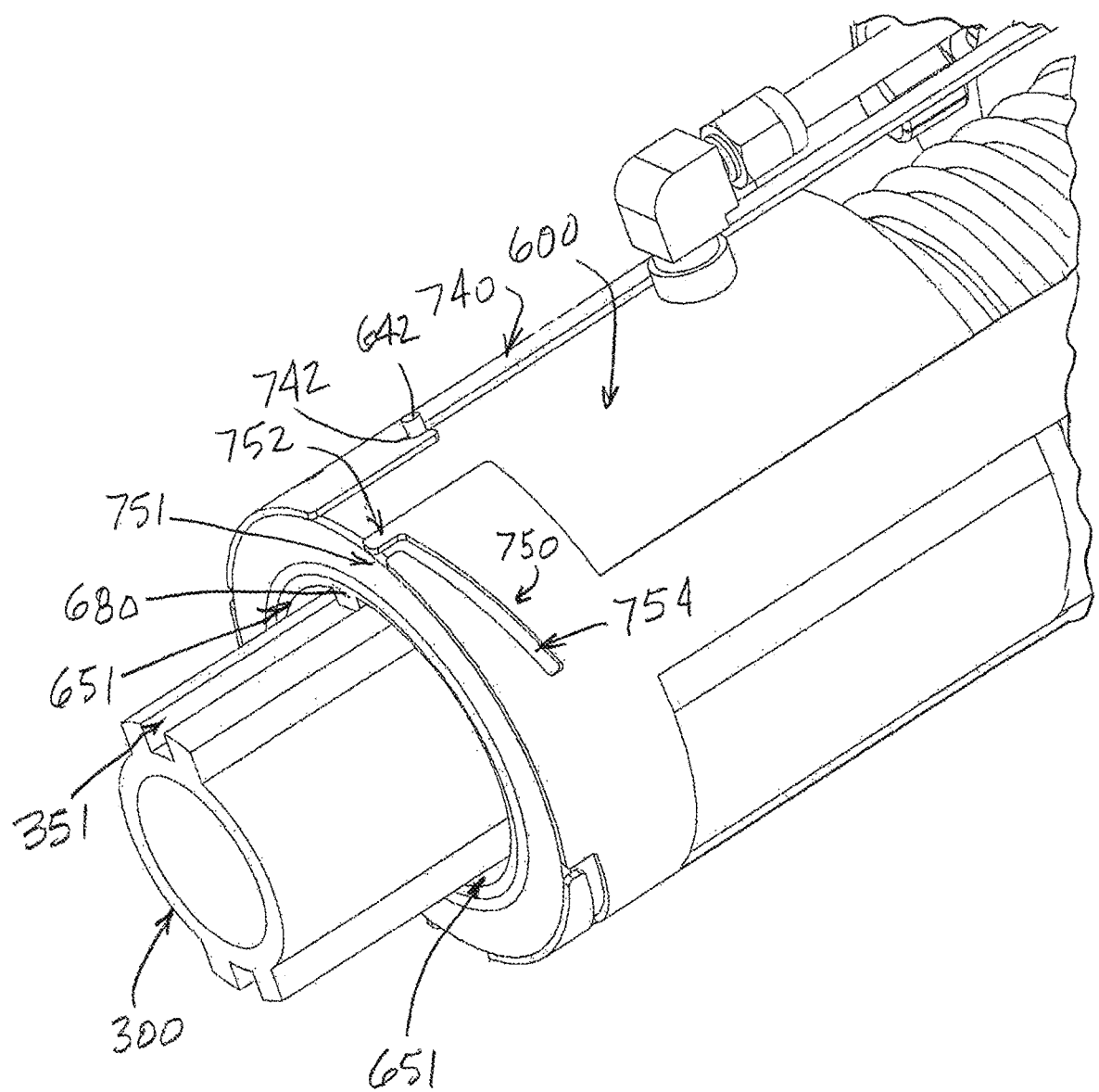
FIG. 8 is an enlarged perspective view of a portion of the hydrogen fuel supply connector of FIG. 3, according to an embodiment of the present disclosure.

As shown in FIG. 8, shroud cover 740 includes at least one catch 742 having an axial opening facing a rearward direction. Catch 742 is operable for engaging at least one first pin 642 attached to shroud 600 to rotatably lock cover 740 to shroud 600. Shroud cover 740 includes at least one locking groove 750 for engaging at least one pin 230 (FIGS. 2 and 7) attached to second connector 200 (FIG. 7) for mattingly engaging shroud 600 with second connector 200 (FIG. 7) of hydrogen fuel tank 20. For example, four locking grooves and locking pins may be provided. Locking groove 750 includes a longitudinally-extending portion 752 having an opening 751 disposed in a forward direction, and an angled curved portion 754. Curved portions may extend circumferentially and longitudinally around the shroud. A shroud rotation key 680 extends into a groove 351 of third connector 300 to keep third connector 300 orientated and fixed relative to shroud 600. A gap 651 is disposed between third connector 300 of hydrogen fuel connector 50 such as the quick disconnect and shroud 600 so that boil-off gas is permitted to pass between third connector 300 of hydrogen fuel connector 50 and shroud 600.

Figure 9:
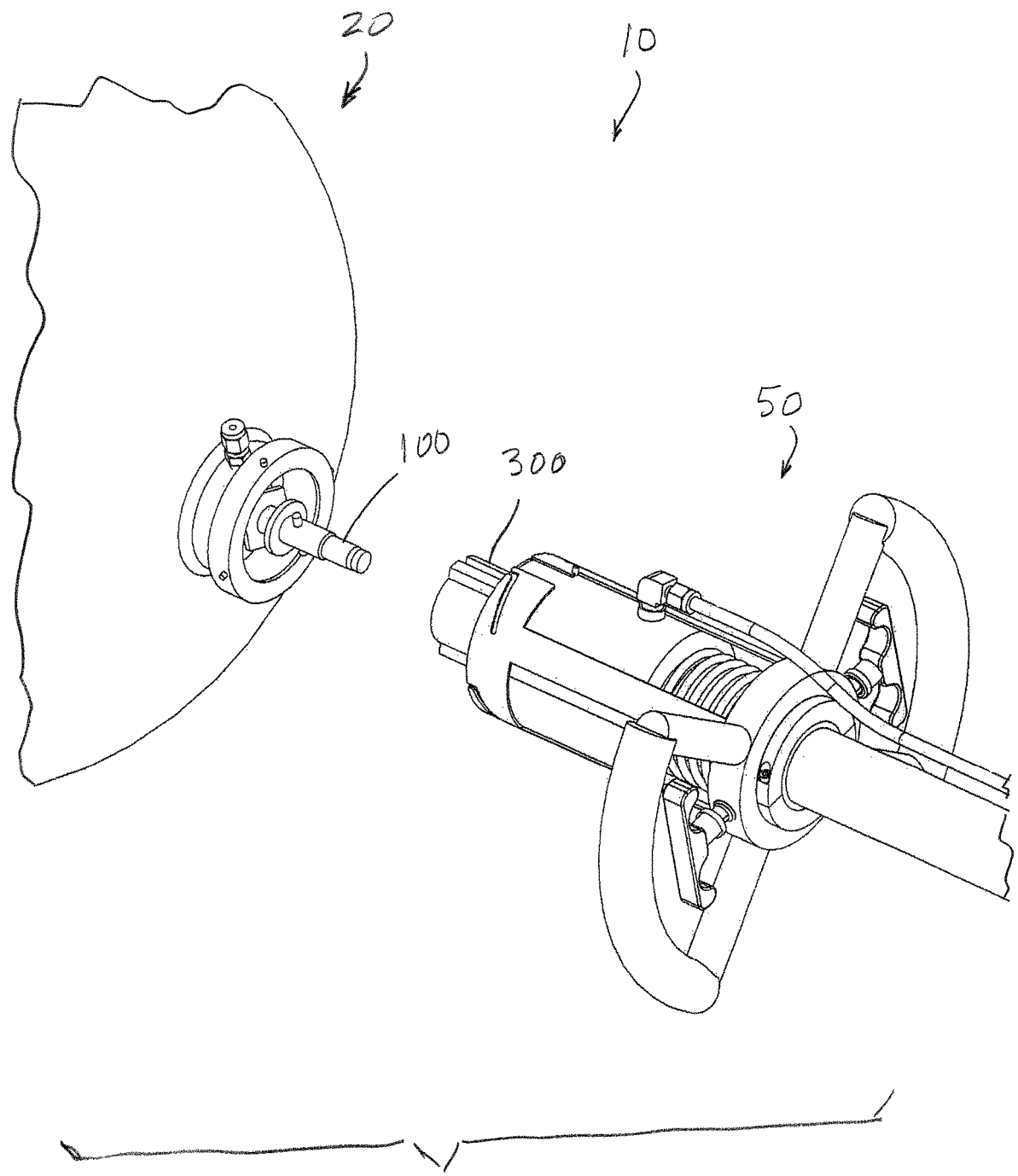
FIGS. 9-14 are perspective views of the hydrogen fuel coupling system of FIG. 1 illustrating the attachment of the hydrogen fuel supply connector to the hydrogen fuel tank, according to an embodiment of the present disclosure.
Figure 10:
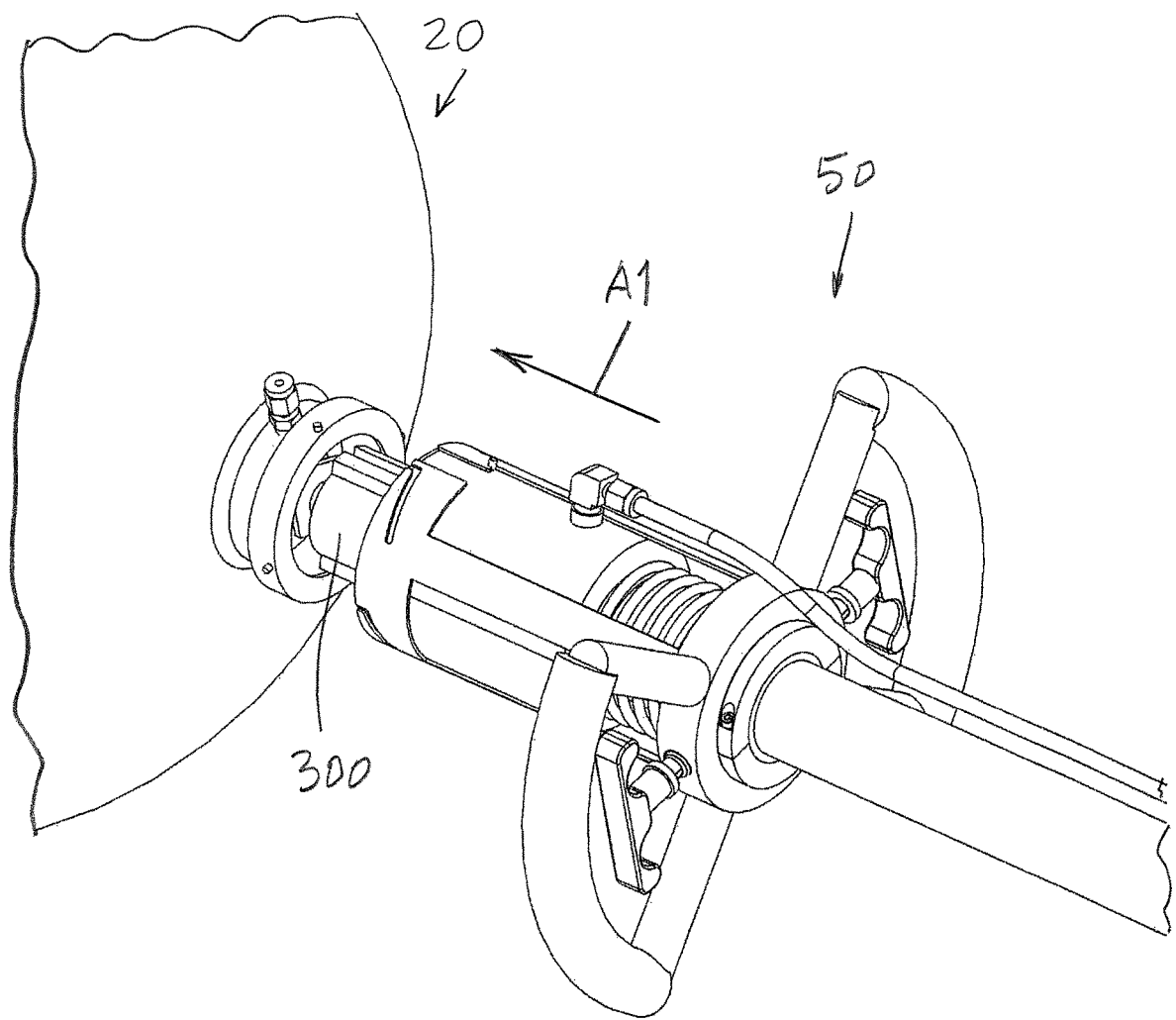

FIGS. 9-14 illustrate a coupling procedure of the hydrogen fuel coupling system 10, according to an embodiment of the present disclosure. In this illustrated embodiment, as shown in FIG. 9, an operator aligns third connector 300 such as a female quick-connect on hydrogen fuel supply connector 50 to first connector 100 such as a male quick-connect on hydrogen fuel tank 20, and as shown in FIG. 10, the operator moves the hydrogen fuel supply connector 50 in the direction of arrow A1 to engage and contact third connector 300 (FIG. 9) to first connector 100 (FIG. 9) on hydrogen fuel tank 20.

Figure 11:
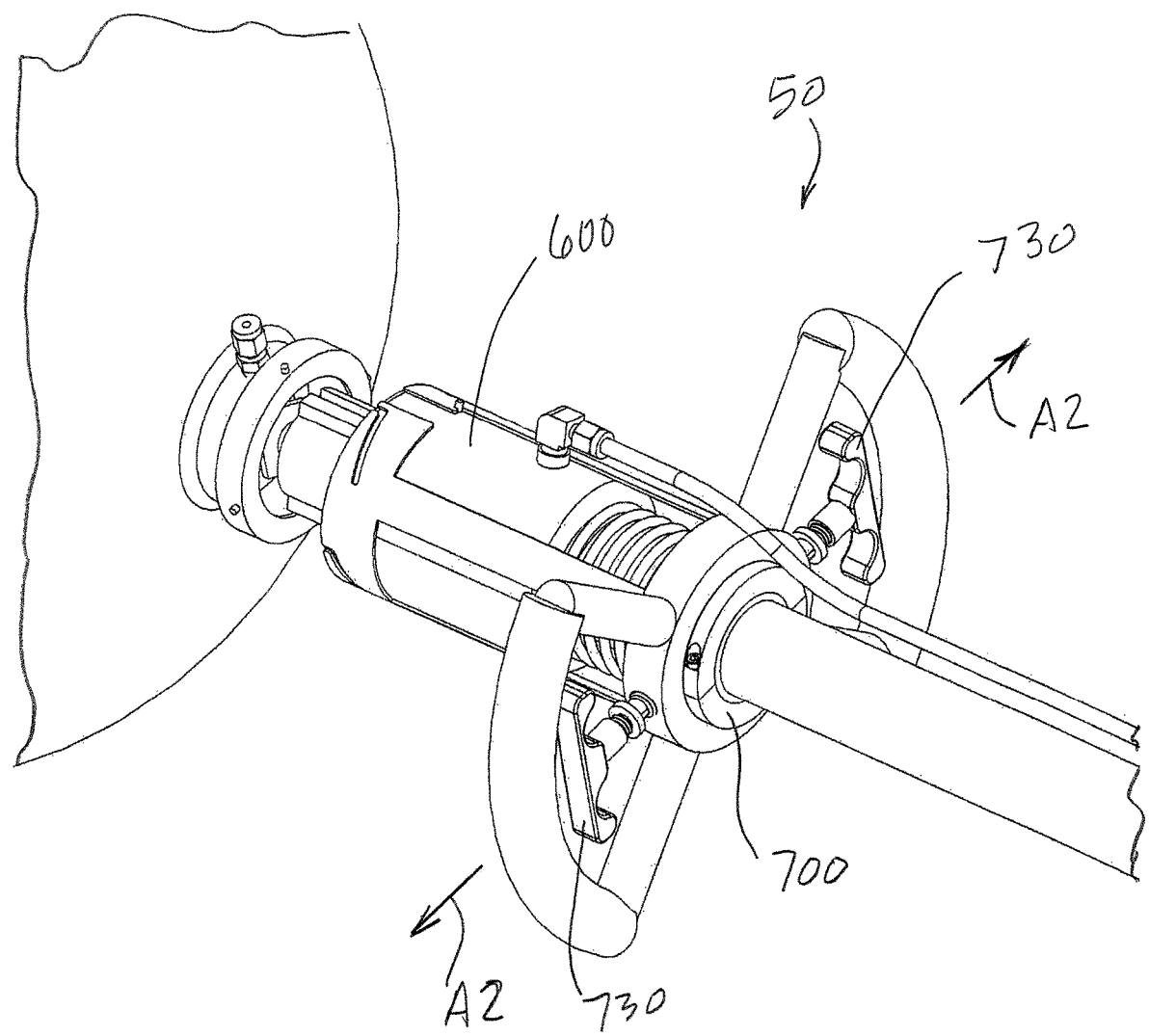

With reference to FIG. 11, the operator may pull inner handles 730 of hydrogen fuel connector 50 outwardly thereby moving spring-loaded movable members 732 (FIG. 7) outwardly in the direction of arrows A2 so that movable members 732 disengage from second groove 704 (FIGS. 4 and 12) of grooved collar 700 allowing, as shown in FIG. 12, the operator to push handles 720 forward in the direction of arrow A3 to slide handles 720 and shroud 600 forward so that fourth connector 400 (FIG. 5) engages second connector 200 on hydrogen fuel tank 20, e.g., sealing face of fourth connector 400 meets the sealing face 225 (FIG. 2) of second connector 200.

Figure 13:
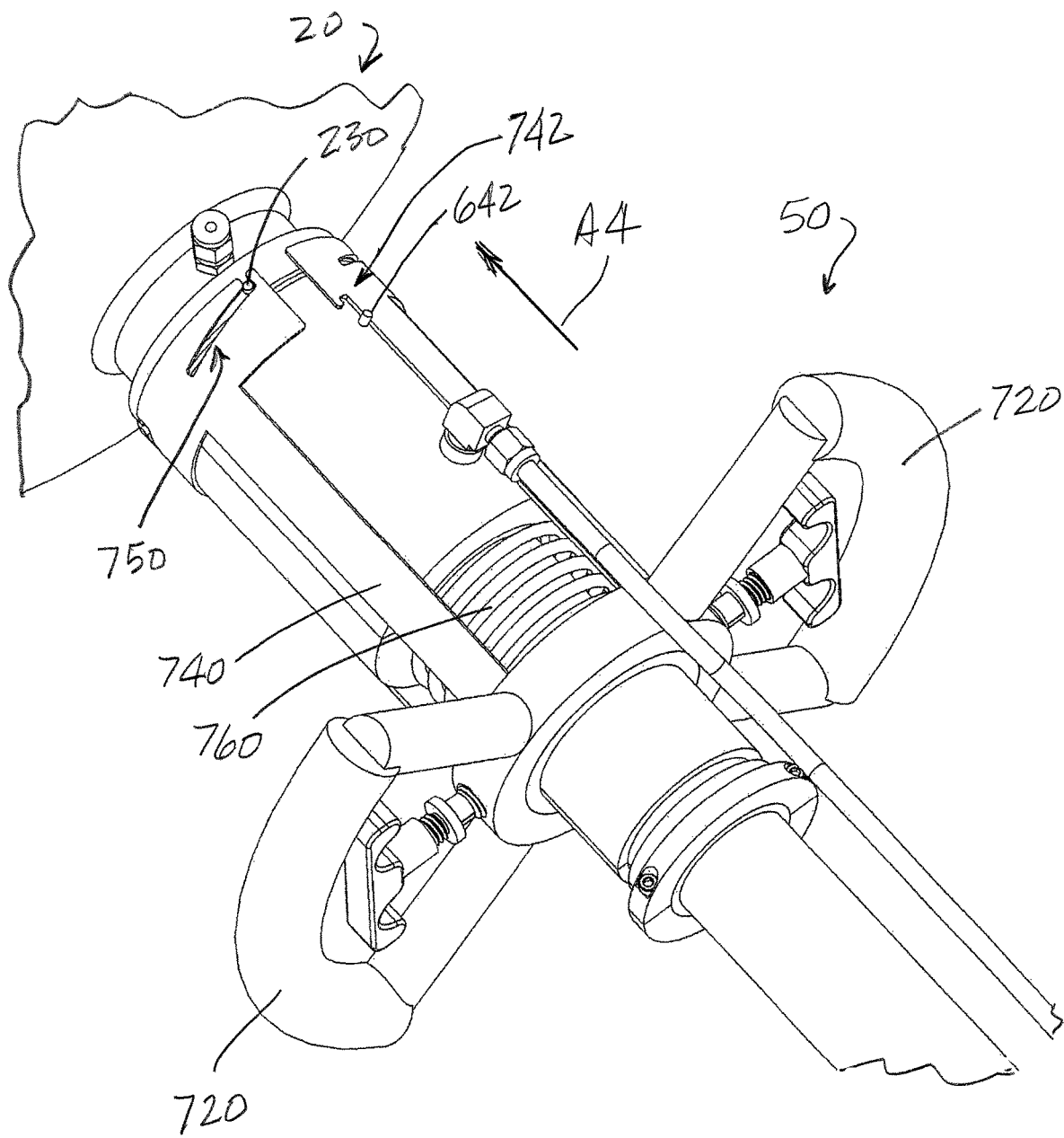
Figure 14:
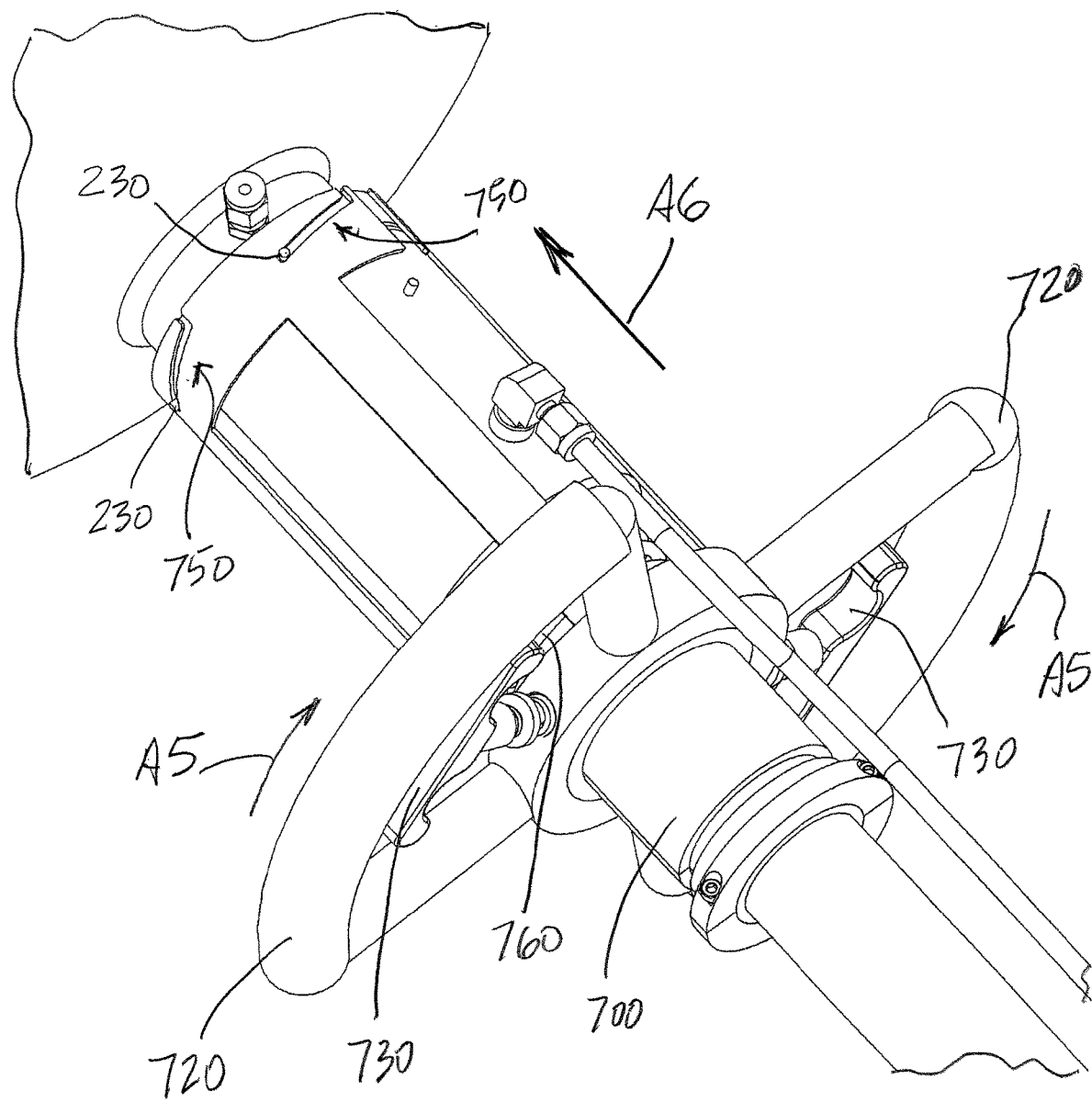

As shown FIG. 13, the operator may push handles 720 of hydrogen fuel supply connector 50 further in the direction of arrow A4 so that locking pins 230 of second connection 200 of fuel tank 20 are received in grooves 750 and catch 742 is released or disengaged from shroud pin 642. As shown in FIG. 14, handles 720 are twisted or rotated in the direction of arrows A5 causing grooves 750 of shroud cover 740 to ride on pins 230 and causing shroud cover 740 and handles 720 to move forward in the direction of arrow A6 and compressing spring 760 (shown also in FIG. 14) until spring-loaded movable member 730 (FIG. 6) of inner handles 730 fall or move into first groove 702 (FIG. 7) of collar 700. This locks the coupling in a closed position, and the hydrogen tank 20 is ready for fueling. Prior to fueling, valve 38 (FIG. 4) is opened allowing boil off gas to leave hydrogen tank 20 and enter the annual gap between shroud 600 and the third connector and hydrogen fuel transfer line.

For example, as shown in FIGS. 6 and 7, initially prior to coupling hydrogen fuel supply 50 to hydrogen fuel tank 20, spring 760 is compressed a distance D1 (FIG. 7) between ring 710 and shroud 600. Upon coupling hydrogen fuel supply 50 to hydrogen fuel tank 20, spring 760 is compressed a distance D2 (FIG. 6) between ring 710 and shroud 600, which distance D2 is less that distance D1. This results in spring 760 increasing the force between exerted the mating surfaces of fourth connector 400 and second connector 200.

Figure 15:
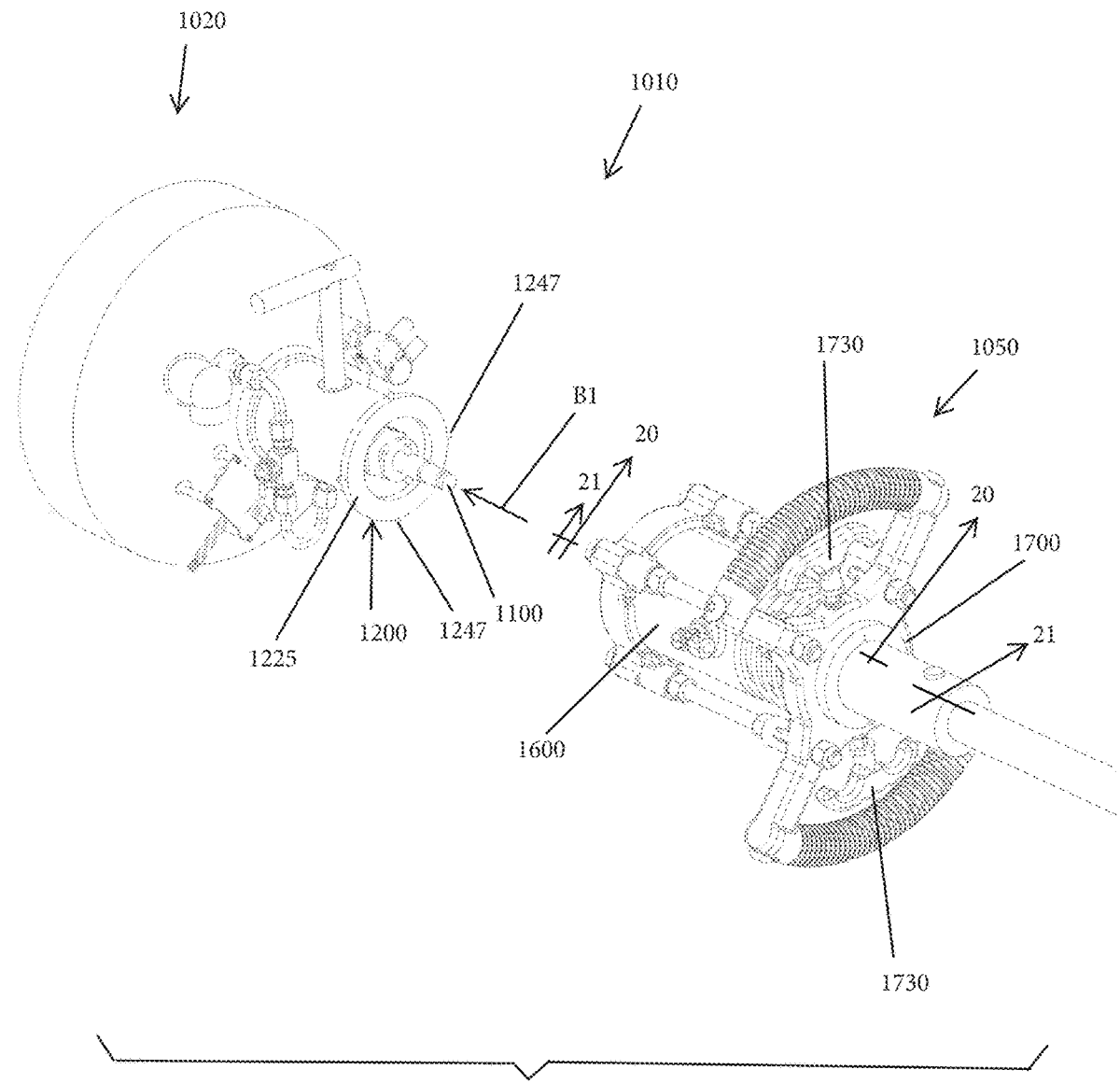
FIG. 15 is a perspective view of a hydrogen fuel coupling system, according to an embodiment of the present disclosure.
Figure 16:
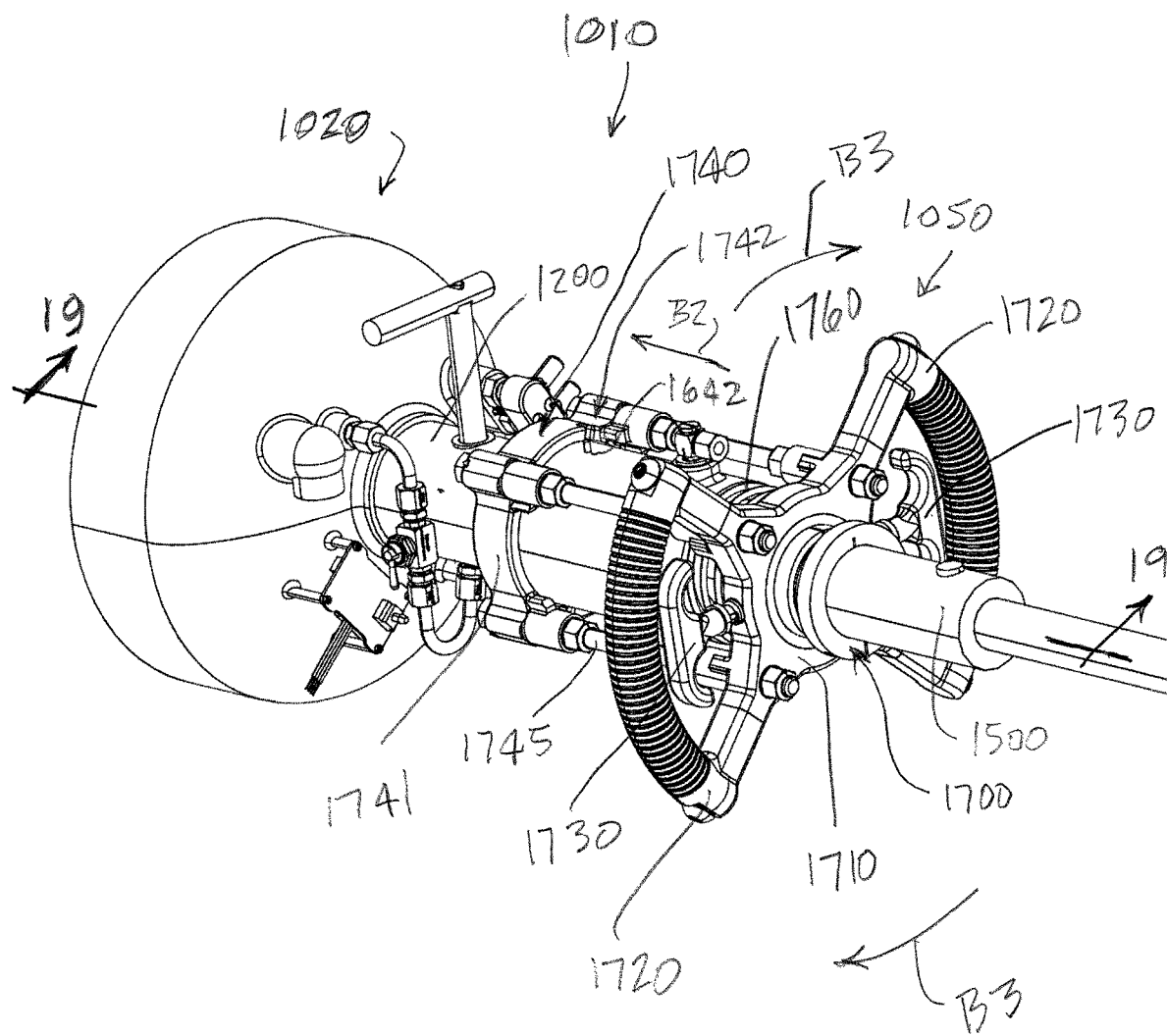
FIG. 16 is a perspective view of the hydrogen fuel coupling system of FIG. 15, with the hydrogen fuel supply connector connected to the hydrogen fuel tank, according to an embodiment of the present disclosure.

FIGS. 15 and 16 illustrate a hydrogen fuel coupling system 1010, according to an embodiment of the present disclosure. In this exemplary embodiment, hydrogen fuel coupling system 1010 may generally include a hydrogen fuel tank 1020 and a hydrogen fuel supply connector 1050.

Figure 17:
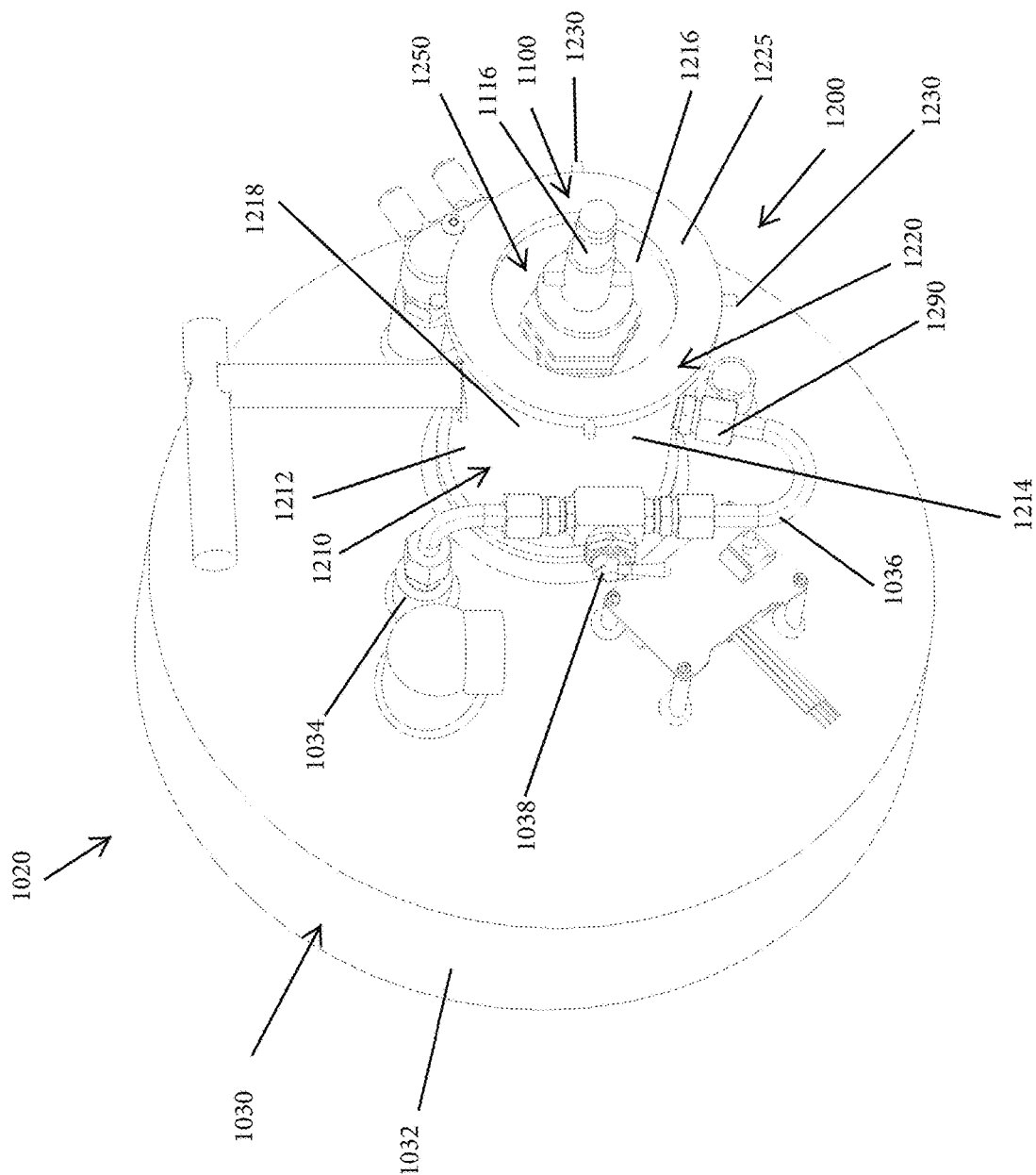
FIG. 17 is an enlarged perspective view of the hydrogen fuel tank of FIG. 15, according to an embodiment of the present disclosure.

As shown in FIG. 17, hydrogen fuel tank 1020 may generally include a body 1030, a first connector 1100, and a second connector 1200, according to an embodiment of the present disclosure. Body 1030 may be a single or multi wall structure having a chamber 1035 (FIG. 19) therein for storing liquid hydrogen.

First connector 1100 is in fluid communication with chamber 1035 (FIG. 19) of body 1030 of hydrogen fuel tank 1020, a portion of hydrogen fuel tank being shown in FIG. 17. In some embodiments, first connector 1100 may be a male portion of a quick connector, or other suitable connector.

With reference still to FIG. 17, second connector 1200 may be disposed around first connector 1100. For example, second connector 1200 may include a hollow cylinder 1210 attached to hydrogen fuel tank 1020. For example, hollow cylinder 1210 may have a first annular end 1212, a second annular end 1214, an inner surface 1216, and an outer surface 1218. First end 1212 is operably attached and sealed to an outer wall 1032 of body 1030 of hydrogen fuel tank 1020. Second end 1214 may be attached to an annular cap 1220 having an annular mating face 1225. An annular cavity 1250 may be disposed between an outer surface 1116 of first connector 1100 and inner surface 1216 of second connector 1200.

A boil-off inlet port 1290 may extend through hollow cylinder 1210 of second connector 1200. Boil-off inlet port 1290 may include a passageway therein for receiving gaseous hydrogen from hydrogen fuel tank 1020. For example, inlet port 1290 may be attached via a tube or boil-off line 1036 to hydrogen fuel tank 1020. A valve 1038 may be provided in boil-off-line 1036 for selectively opening and closing boil-off line 1036.

Second connector 1200 may include a plurality of locking pins 1230 extending outwardly from hollow cylinder 1210. For example, plurality of locking pins 1230 may include four locking pins, each of which disposed 90 degrees from each other along annular cap 1220.

Figure 18:
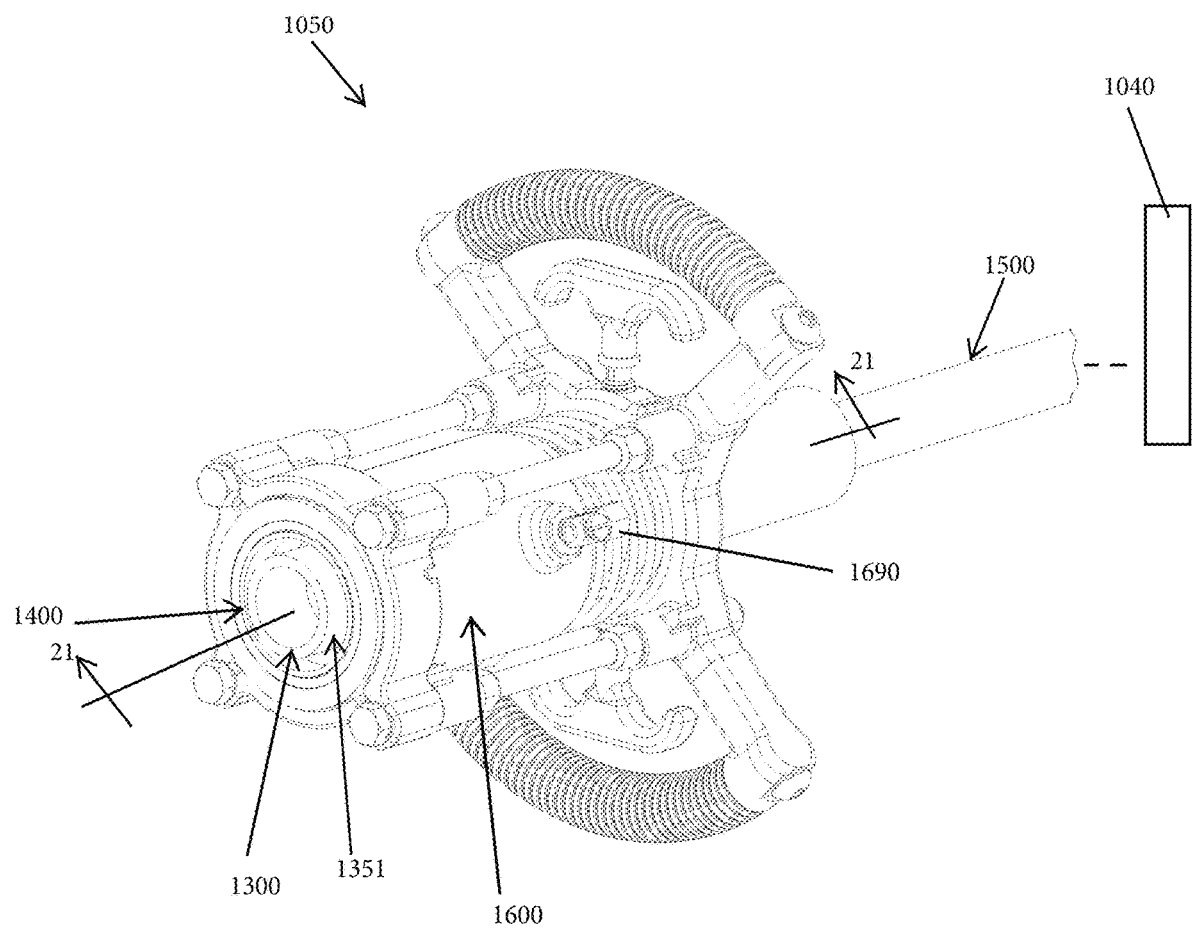
FIG. 18 is an enlarged perspective view of the hydrogen fuel supply connector of FIG. 15, according to an embodiment of the present disclosure.

With reference to FIG. 18, hydrogen fuel supply connector 1050 may generally include a third connector 1300, a fourth connector 1400, a hydrogen fuel transfer line 1500, a boil-off shield or shroud 1600, and a boil-off vent 1690, according to an embodiment of the present disclosure. Hydrogen fuel transfer line 1500 may be operably connectable to a liquid hydrogen supply 1040.

Fuel transfer line 1500 and shroud 1600 may be essentially the same as fuel transfer line 500 (FIG. 5) and shroud 600 (FIG. 5) described above. Boil-off vent 1690 is connected to shroud 1600 for venting gaseous hydrogen from an annular gap 1650 (FIG. 19).

Figure 19:
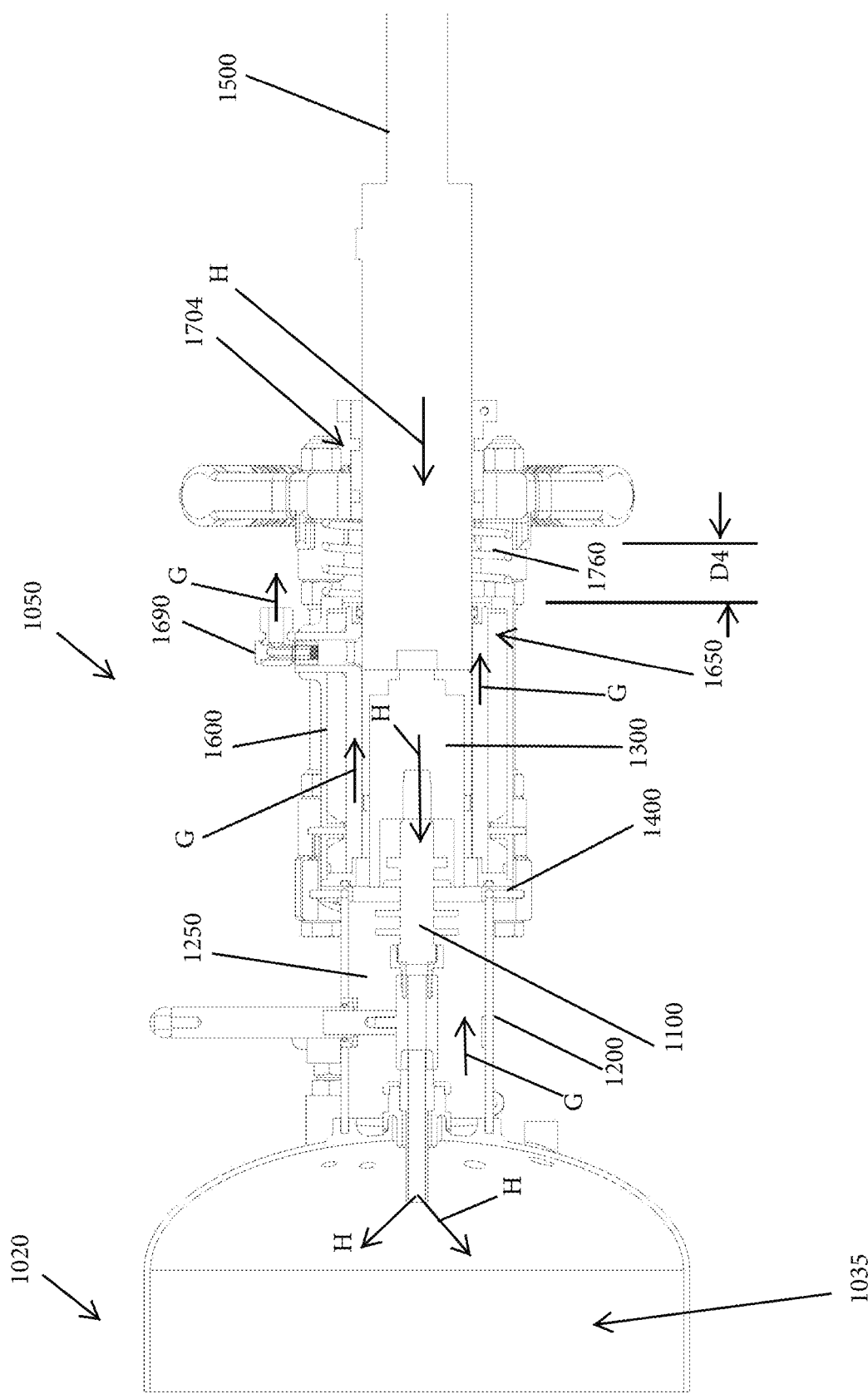
FIG. 19 is a cross-sectional view of the hydrogen fuel coupling system taken along line 19-19 in FIG. 16, according to an embodiment of the present disclosure.

As shown in FIG. 19, third connector 1300 may be operably sealably connected to hydrogen fuel transfer line 1500 and operably sealably connectable to first connector 1100 of hydrogen fuel tank 1020 for supplying liquid hydrogen from liquid hydrogen supply 1040 (FIG. 18) to chamber 1035 of hydrogen fuel tank 1020. In some embodiments, third connector 1300 may be a female portion of a quick connector, or other suitable connector.

Figure 20:
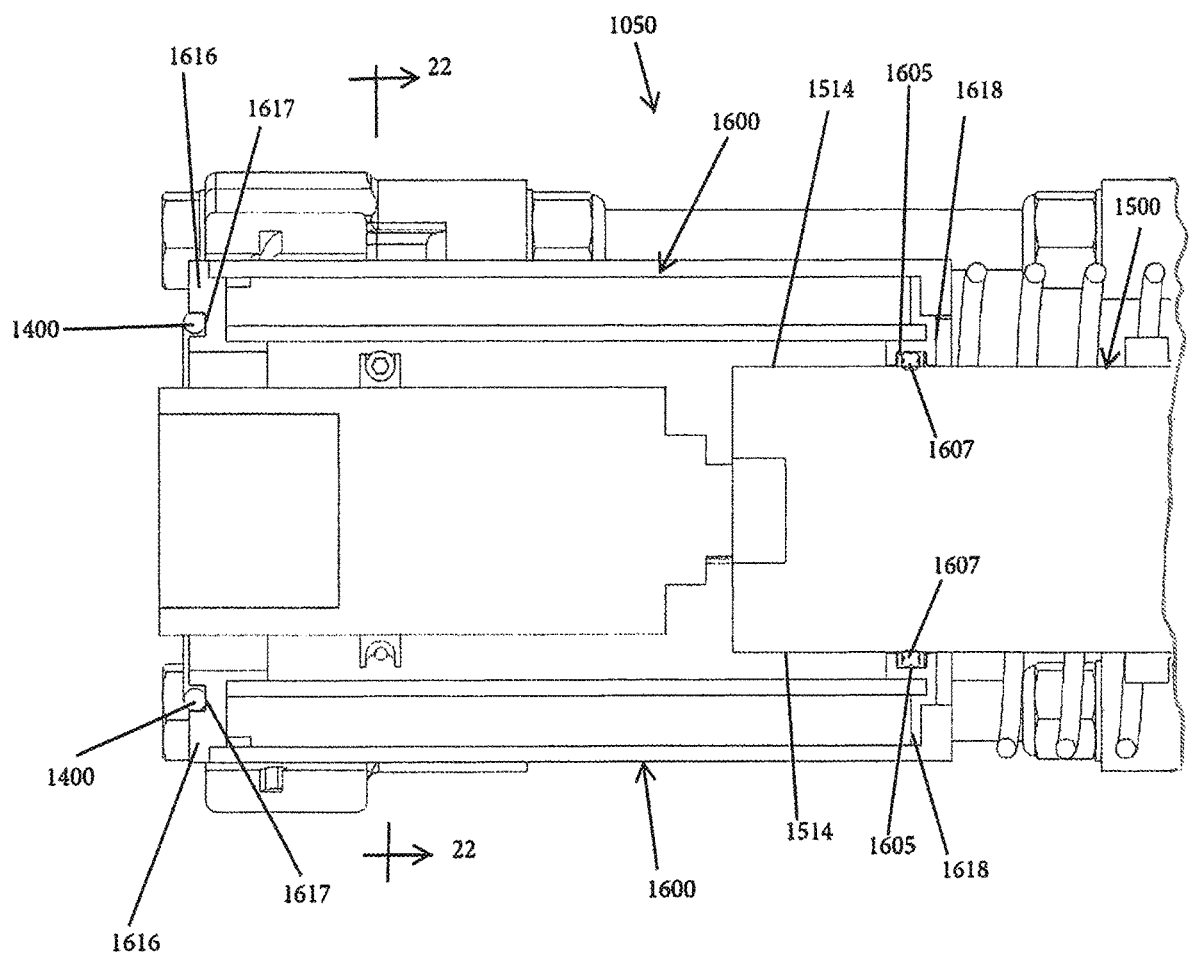
FIG. 20 is an enlarged cross-sectional view of a portion of the hydrogen fuel supply connector taken along line 20-20 in FIG. 15, according to an embodiment of the present disclosure.

As shown in FIG. 20, shroud 1600 may be operably sealed to fuel transfer line 1500. Shroud 1600 may slidably and sealably engage outer surface 1514 of fuel transfer line 1500. For example, second end wall 1618 may include an annular groove 1605 for receiving a seal 1607 such as an O-ring or annular seal formed from, for example, a synthetic rubber or plastic material. It will be appreciated that the slidable sealing of the second end 1618 of shroud 1600 to fuel transfer line 1500 may employ other slidable sealable mating surfaces or engagements.

Fourth connector 1400 may operably seal a first end wall 1616 of shroud 1600 to second connector 1200 (FIG. 19) of hydrogen fuel tank 1020 (FIG. 19) for receiving gaseous hydrogen from chamber 1035 (FIG. 19) of hydrogen fuel tank 1020 (FIG. 19) as described below. For example, first end wall 1616 of shroud 1600 may include an annular groove 1617 for receiving fourth connector 1400 for mating and sealably engaging first end wall 1616 of shroud 1600 to surface 1225 (FIG. 17) of second connector 1200 (FIG. 17). In some embodiments, fourth connector may be an O-ring or annular seal formed from, for example, a synthetic rubber or plastic material. It will be appreciated that second connection and fourth connector may employ other sealable mating surfaces or engagements.

With reference again to FIG. 19, third connector 1300 is initially connected to first connector 1100, then fourth connector 1400 is connected to second connector 1200 as further described below. When fuel supply connector 1050 is operably connected to hydrogen fuel tank 1020, liquid hydrogen from a hydrogen supply 1040 (FIG. 18) may be made to traverse the passageway in fuel transfer line 1500 in the direction of arrows H to a chamber 1035 in hydrogen fuel tank 1020. With reference to FIG. 17, upon initial filing of hydrogen fuel tank 1020 with liquid hydrogen, gaseous hydrogen generated in hydrogen fuel tank 1020 flows via a boil-off outlet port 1034 attached to hydrogen fuel tank 1020, through a boil-off line 1036, through boil-off inlet port 1290, through cavity 1250, and as shown in FIG. 19, through gap 1650 in the direction of arrows G, and vented from gap 1650 in shroud 1600 via boil-off vent 1690 to inhibit liquification of ambient air near or on attached first connector 1100 to third connector 1300 and transfer line 1500.

Figure 21:
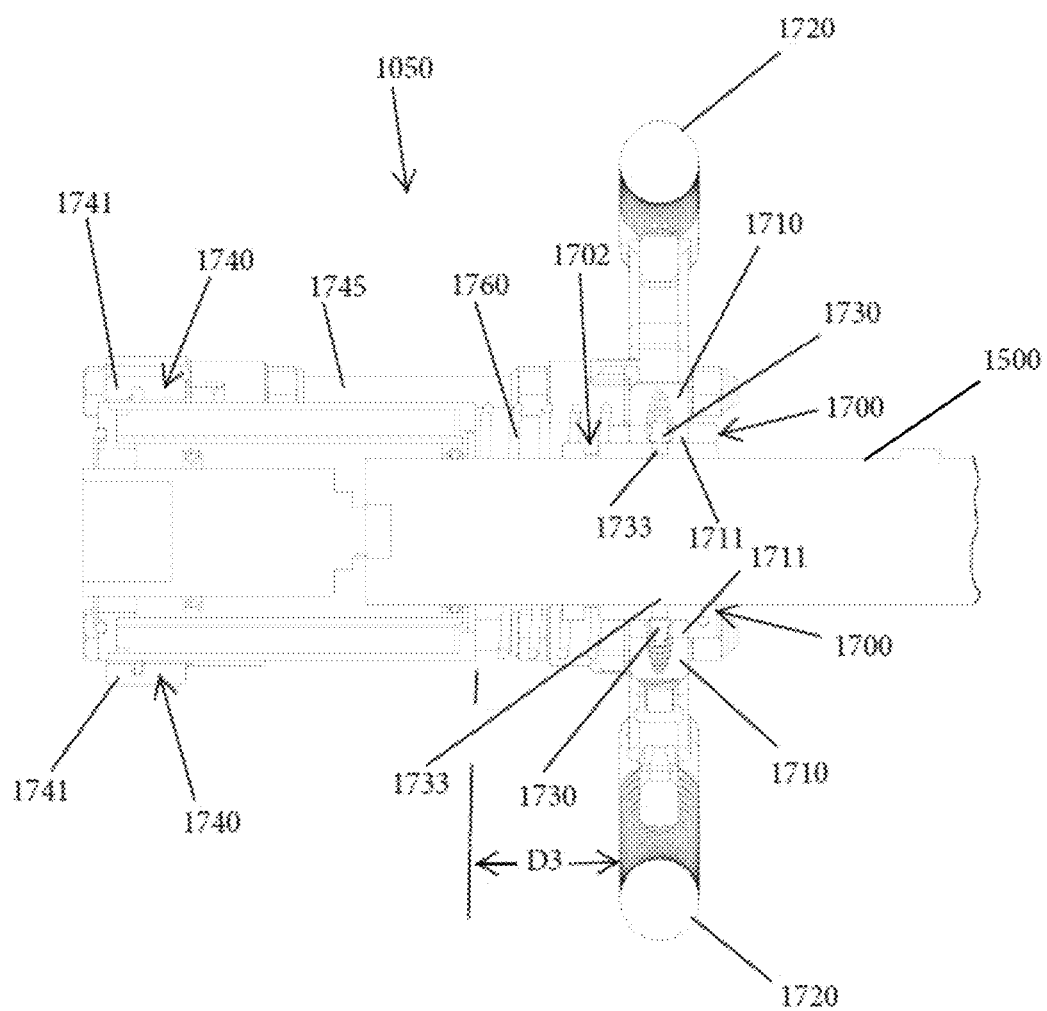
FIG. 21 is a cross-sectional view of the hydrogen fuel coupling system taken along line 21-21 in FIG. 18, according to an embodiment of the present disclosure.

With reference to FIGS. 16 and 21, hydrogen fuel supply connector 1050 may also include a grooved collar 1700, a ring 1710, one or more outer handles 1720, one or more inner handles 1730 (FIG. 16), a shroud cover 1740, and a compression spring 1760, according to an embodiment of the present disclosure.

For example, collar 1700 may include a first groove 1702 (FIG. 21) and a spaced apart second groove 1704 (best shown in FIG. 19). Collar 1700 extends around and includes an inner surface operably fixedly secured to an outer surface of hydrogen fuel transfer line 1500. Ring 1710 is slidably disposed around the grooved collar. At least one outer handle 1720 is fixedly attached to ring 1710. Inner handle 1730 (FIG. 16) is movably attached to ring 1710 and may include a spring biased movable member 1730 (FIG. 21). Inner handle 1730 may be spring biased so that a distal end 1733 (FIG. 21) of movable member 1730 is selectably disposable in first groove 1702 (FIG. 21) of collar 700 and second groove 1704 (FIG. 19). Shroud cover 1740 includes a ring 1741 and a plurality of bolts 1745 that connect second ring 1741 to ring 1710. Shroud cover 1740 extends around shroud 600. In some embodiments, ring 1710 may include a TEFLON bearing 1711 (FIG. 21) that slidably moves along collar 1700.

Ring 1710, outer handle 1720, inner handle 1730 (FIG. 16), and second ring 1740 are slidable as a unit relative to collar 1700 between a first locked position as shown in FIGS. 15 and 21 prior to connecting hydrogen fuel supply connector 1050 to hydrogen fuel tank 1020 (FIG. 15), and a second locked position as shown in FIGS. 16 and 19 upon connecting hydrogen fuel supply connector 1050 to hydrogen fuel tank 1020, as described further below.

Figure 22:
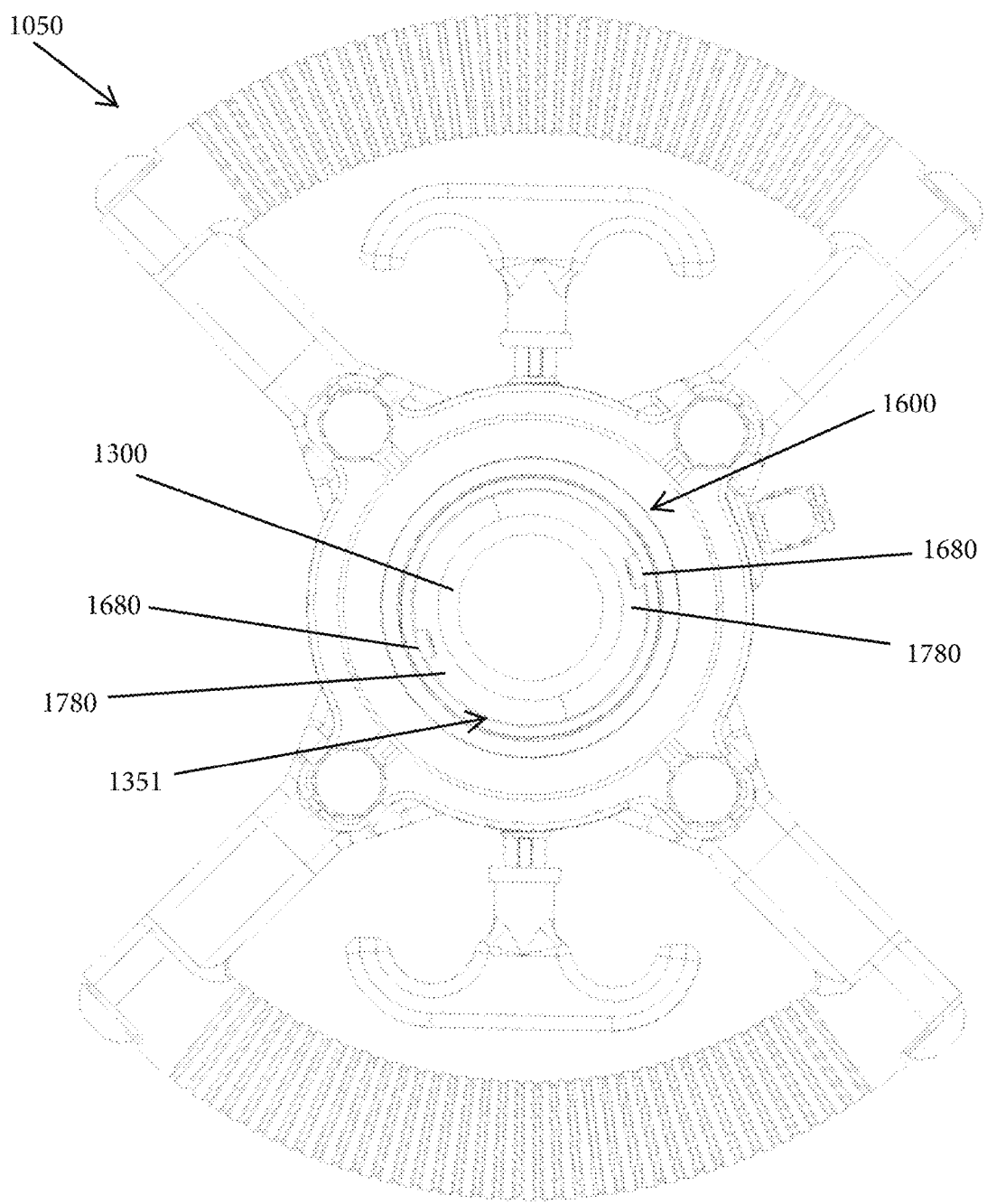
FIG. 22 is an enlarged end view of the hydrogen fuel supply connector of FIG. 18, according to an embodiment of the present disclosure.

As shown in FIG. 22, one or more shroud rotation keys 1680 may extend from the inner wall of shroud 1600 and into one or more grooves in an annular member 1780 attached to third connector 1300 to keep third connector 1300 orientated and fixed relative to shroud 1600.

Figure 23:
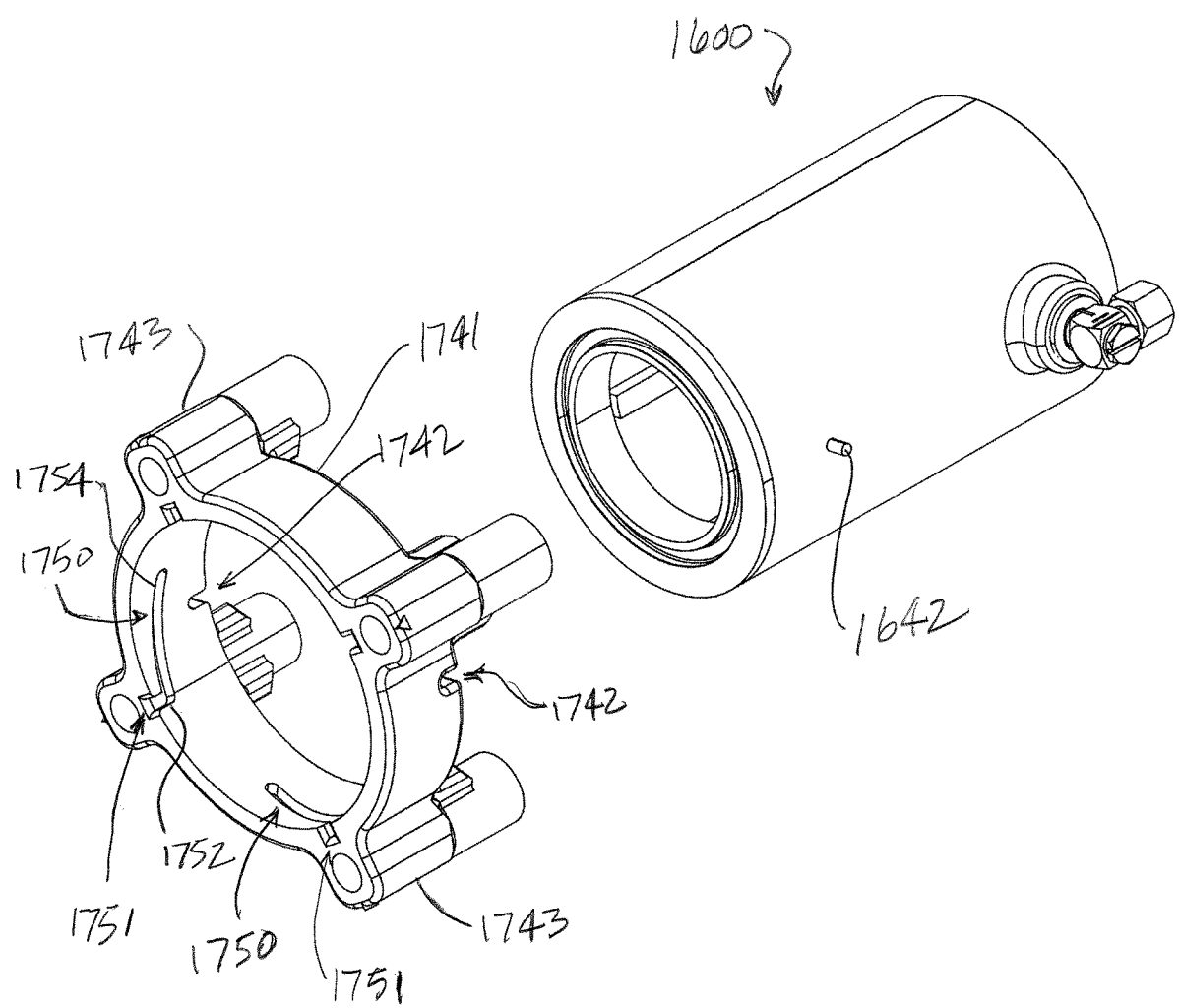
FIG. 23 is an enlarged perspective view of the collar and shroud of the hydrogen fuel supply connector of FIG. 18, according to an embodiment of the present disclosure.

As shown in FIG. 23, second ring 1741 includes at least one catch 1742 having an axial opening facing a rearward direction. Catch 1742 is operable for engaging at least one first pin 1642 attached to shroud 1600 to rotatably lock second ring 1741, and thus the shroud cover, to shroud 1600. Second ring 1741 includes at least one locking groove 1750 for engaging at least one pin 1230 (FIG. 17) attached to second connector 1200 (FIG. 17) for mattingly engaging shroud 1600 with second connector 1200 (FIG. 17) of hydrogen fuel tank 1020 (FIG. 17). For example, four locking grooves and locking pins may be provided. Locking groove 1750 includes a longitudinally-extending portion 1752 having and opening 1751 disposed in a forward direction, and an angled curved portion 1754. The curved portions may extend circumferentially and longitudinally around the shroud.

With reference again to FIG. 18, a gap 1351 is disposed between third connector 1300 of hydrogen fuel connector 1050 such as the quick disconnect and shroud 1600 so that boil-off gas is permitted to pass between third connector 1300 of hydrogen fuel connector 1050 such as between a quick connect and shroud 1600.

With reference again to FIGS. 15 and 16, a coupling procedure of the hydrogen fuel coupling system 1010 may include the following, according to an embodiment of the present disclosure. In this illustrated embodiment, as shown in FIG. 15, an operator aligns third connector 1300 (FIG. 18) such as a female quick connect on hydrogen fuel supply connector 1050 to first connector 1100 such as a male quick connect on hydrogen fuel tank 1020. The operator then moves the hydrogen fuel supply connector 1050 in the direction of arrow B1 to engage and contact third connector 1300 (FIG. 18) to first connector 1100 (FIG. 17) on hydrogen fuel tank 1020.

The operator may pull inner handles 1730 of hydrogen fuel connector 1050 outwardly thereby moving spring-loaded movable members 1733 (FIG. 21) laterally outwardly so that movable members 1733 (FIG. 21) disengage from second groove 1704 (FIG. 19) of grooved collar 1700 allowing the operator to push handles 1720 forward in the direction of arrow B1 to slide handles 1720 and shroud 1600 forward so that fourth connector 1400 (FIG. 18) engages second connector 1200 on hydrogen fuel tank 1020, e.g., sealing face or O-ring of fourth connector 1400 meets the sealing face 1225 (FIG. 2) of second connector 1200.

As shown FIG. 16, the operator may push handles 1720 of hydrogen fuel supply connector 1050 further in the direction of arrow B2 (FIG. 16) so that locking pins 1247 (FIG. 15) of second connection 1200 of fuel tank 1020 are received in grooves 1750 (FIG. 23) and catch 1742 is released or disengaged from shroud pin 1642. Handles 1720 are twisted or rotated in the direction of arrows B3 causing grooves 1750 (FIG. 23) of shroud cover 1740 to received and ride on pins 1230 (FIG. 17) and cause shroud cover 1740 and handles 1720 to move forward in the direction of arrow B2 further compressing spring 1760 until spring-loaded members 1730 (FIG. 21) of inner handles 730 fall or move into first groove 702 (FIG. 21) of collar 1700. This locks the coupling in a closed position, and the hydrogen tank 1020 is ready for fueling. Prior to fueling, valve 1038 is opened allowing boil off gas to leave hydrogen tank 1020 and enter shroud 1600.

For example, as shown in FIGS. 19 and 21, initially prior to coupling hydrogen fuel supply 1050 to hydrogen fuel tank 1020, spring 1760 is compressed a distance D3 (FIG. 21) between ring 1710 and shroud 1600. Upon coupling hydrogen fuel supply 1050 to hydrogen fuel tank 1020, spring 1760 is compressed a distance D4 (FIG. 19) between ring 1710 and shroud 1600, which distance D4 is less that distance D3. This results in spring 1760 increasing the force between the mating surfaces of fourth connector 1400 and second connector 1200.

Figure 24:
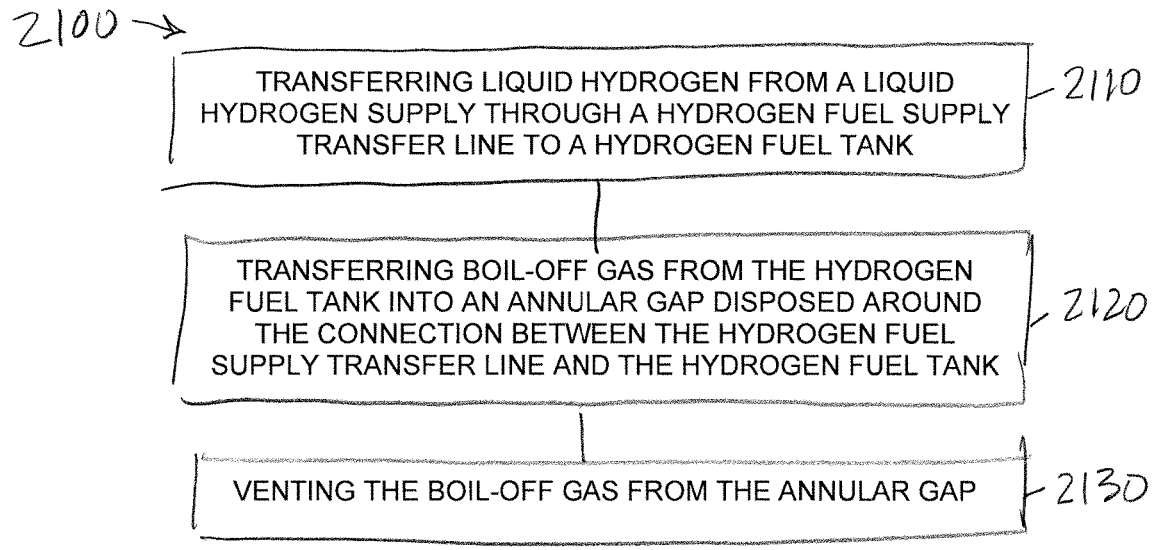
FIG. 24 is a flowchart of a method for supplying liquid hydrogen to a tank, according to an embodiment of the present disclosure.

FIG. 24 illustrates a method 2100 for supplying liquid hydrogen to a tank, according to an embodiment of the present disclosure. In this illustrated embodiment, method 2100 includes at 2110 transferring liquid hydrogen from a liquid hydrogen supply through a hydrogen fuel supply transfer line to a hydrogen fuel tank, at 2120 transferring boil-off gas from the hydrogen fuel tank into an annular gap disposed around the connection between the hydrogen fuel supply transfer line and the hydrogen fuel tank, and at 2130 venting the boil-off gas from the annular gap.

Figure 25:
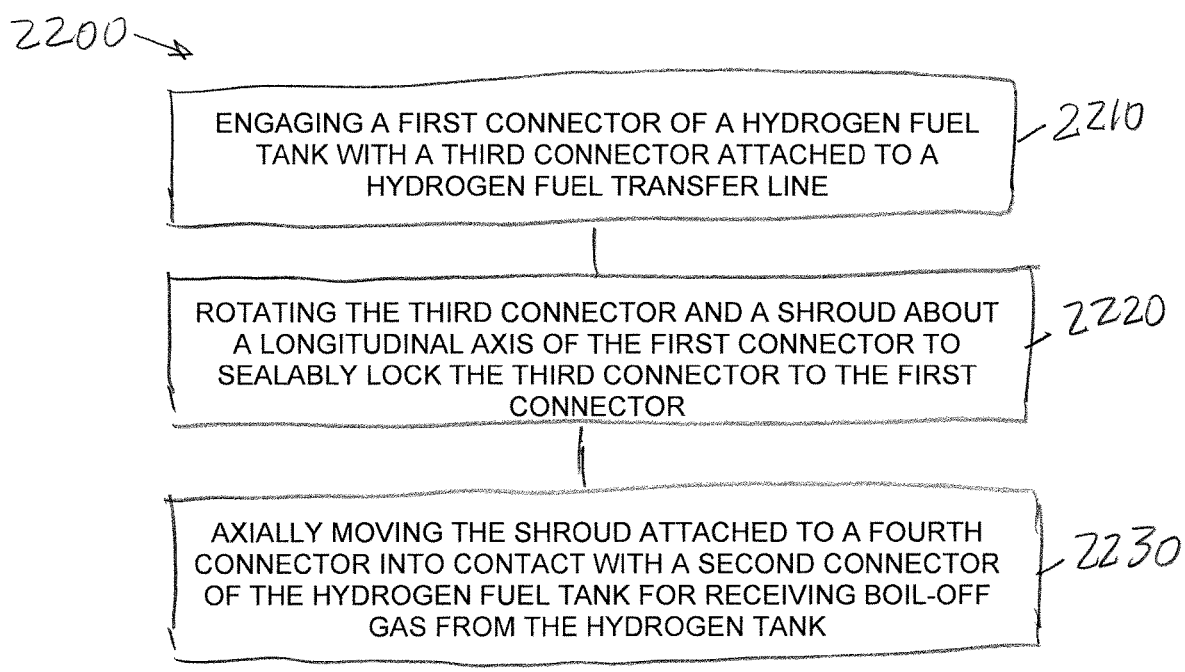
FIG. 25 is a flowchart of a method for connecting a hydrogen supply transfer line to a hydrogen tank, according to an embodiment of the present disclosure.

FIG. 25 illustrates a method 2200 for connecting a hydrogen supply transfer line to a hydrogen tank, according to an embodiment of the present disclosure. In this illustrated embodiment, method 2200 includes at 2210 engaging a first connector of a hydrogen fuel tank with a third connector attached to a hydrogen fuel transfer line, at 2220 rotating the third connector and a shroud about a longitudinal axis of the first connector to sealably lock the third connector to the first connector, and at 2230 axially moving the shroud attached to a fourth connector into contact with a second connector of the hydrogen fuel tank for receiving boil-off gas from the hydrogen tank.

The technique of the present disclosure provides a sealed boil-off shielded coupling in which flow of hydrogen boil-off gas is directed over a quick-connect fitting between a hydrogen fuel transfer line and a fuel tank to displace air and prevent accumulation of liquid oxygen. Because the shroud is sealed, the boil-off gas may then be routed back along the liquid hydrogen transfer line to a fueling station for safe venting. In other embodiments, the boil-off gas may not be routed back along the liquid hydrogen transfer line. In some embodiments, the coupling systems may include a single quick connector. For example, a fuel tank may require only a male quick-connect fitting and flat sealing face, which minimizes weight of the tank. Advantageously, the technique of the present disclosure may allow filling small-scale liquid hydrogen tanks such as in aerospace applications like unmanned aerial vehicles having lighter fittings compared to conventional heavy fittings or connectors that are impractical and can even be heavier than the aircraft maximum takeoff weight.

As may be recognized by those of ordinary skill in the art based on the teachings herein, numerous changes and modifications may be made to the above-described and other embodiments of the present disclosure without departing from the scope of the disclosure. In addition, the devices and apparatus may include more or fewer components or features than the embodiments as described and illustrated herein. Further, the above-described embodiments and/or aspects thereof may be used in combination with each other. Accordingly, this detailed description of the currently-preferred embodiments is to be taken as illustrative, as opposed to limiting the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements but is not limited to possessing only those one or more steps or elements. Likewise, a step of a method or an element of a device that "comprises", "has", "includes" or "contains" one or more features possesses those one or more features but is not limited to possessing only those one or more features. Furthermore, a device or structure that is configured in a certain way is configured in at least that way but may also be configured in ways that are not listed.

For the purposes of promoting an understanding of the principles of the disclosure, reference is made above to embodiments of the disclosure and specific language describing the same. It will nevertheless be understood that no limitation of the scope of the disclosure is thereby intended, and any alterations and further modifications in the described embodiments, and any further applications of the principles of the disclosure as illustrated therein as would normally occur to one skilled in the art to which the disclosure relates are contemplated and protected.

The invention claimed is:

1. A hydrogen fuel coupling system comprising:
a hydrogen fuel tank comprising:
   a body with a chamber therein for storing liquid hydrogen;
   a first connector in fluid communication with the chamber;
   a second connector disposed around the first connector, the second connector having a boil-off inlet port for receiving gaseous hydrogen from the chamber;
a hydrogen fuel supply connector comprising:
   a hydrogen fuel transfer line having a passageway therethrough and operably connectable to a liquid hydrogen supply;
   a third connector for operably sealably connecting the hydrogen fuel transfer line to the first connector of the hydrogen fuel tank for supplying liquid hydrogen, via the passageway, to the chamber in the hydrogen fuel tank;
   a shroud extending around the third connector and the hydrogen fuel transfer line defining a gap therebetween, the shroud having a first end and a second end, the second end operably sealably engageable with the hydrogen fuel transfer line;
   a fourth connector for operably sealably connecting a first end of the shroud to the second connector of the hydrogen fuel tank; and
   a boil-off vent connected to the shroud for venting gas from the gap.

2. The system of claim 1 further comprising:
a grooved collar fixedly disposed around the hydrogen fuel transfer line, the grooved collar having a first groove and a spaced-apart second groove;
a ring slidably disposed around the grooved collar;
a compression spring disposed between the shroud and the ring for biasing the shroud away from the ring;
at least one first handle fixedly attached to the ring;
at least one second handle movably attached to the ring, the second handle attached to a movable member having a distal end selectably disposable in the first groove and the second groove; and
a cover extending around the shroud, the cover fixedly connected to the ring, the cover comprising:
   at least one catch selectively engageable with at least one first pin attached to the shroud to selectively rotatably lock the cover to the shroud; and
   at least one curved groove selectively engageable with at least one second pin attached to the second connector of the hydrogen fuel tank to move the cover and ring relative to the shroud.

3. The system of claim 2 wherein:
the cover is slidable axially along a longitudinal axis of the hydrogen fuel supply connector to disengage the catch from the at least one first pin to allow rotation of the cover relative to the shroud; and
the curved groove is slidably movable around the longitudinal axis of the hydrogen fuel supply connector and the at least one second pin to longitudinally move the cover relative to the shroud.

4. The system of claim 2 wherein:
the at least one first handle is rotatable about a longitudinal axis of the hydrogen fuel transfer line to rotate the third connector; and
the at least one first handle is movable axially along the longitudinally axis to engage the fourth connector with the second connector.

5. The system of claim 1 wherein:
the second connector comprise an annular sealing surface disposed perpendicular to the longitudinal axis of the first connector; and
the fourth connector comprises an annular seal engageable with the annular sealing surface of the second connector.

6. The system of claim 5 wherein:
the annular seal comprises an O-ring.

7. The system of claim 1 wherein:
the shroud is movable independently relative to the hydrogen fuel transfer line.

8. The system of claim 1 wherein:
the first connector comprises a male quick connector;
the third connector comprises a female quick connector; and
the second connector and the fourth connector comprises a non-quick connector.

9. The system of claim 1 wherein:
the third connector is sealably connectable to the first connector prior to the fourth connector being sealably connectable to the second connector.

10. The system of claim 1 wherein:
the shroud comprises an inner wall, an outer wall, and a first end and a second end connecting the inner wall to the outer wall to define a cavity therebetween.

11. The system of claim 10 wherein:
the cavity in the shroud comprises an insulation material.

12. The system of claim 1 further comprising an unmanned aerial vehicle, and the hydrogen fuel tank disposed in the unmanned aerial vehicle.

13. A method comprising:
providing the hydrogen fuel coupling system of claim 1;
connecting the hydrogen fuel supply connector to the hydrogen fuel tank;
supplying liquid hydrogen from a liquid hydrogen supply via the hydrogen fuel supply connector to the hydrogen fuel tank; and
venting boil-off gas from the shroud.

* * * * *